(12) United States Patent
Koo et al.

(10) Patent No.: US 8,983,511 B2
(45) Date of Patent: Mar. 17, 2015

(54) METHOD FOR TRANSCEIVING A SIGNAL, AND BASE STATION AND USER EQUIPMENT FOR SAME

(75) Inventors: Ja Ho Koo, Anyang-si (KR); Ji Won Kang, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 13/581,250

(22) PCT Filed: Jan. 28, 2011

(86) PCT No.: PCT/KR2011/000606
§ 371 (c)(1),
(2), (4) Date: Aug. 24, 2012

(87) PCT Pub. No.: WO2011/105704
PCT Pub. Date: Sep. 1, 2011

(65) Prior Publication Data
US 2012/0322492 A1  Dec. 20, 2012

Related U.S. Application Data

(60) Provisional application No. 61/308,312, filed on Feb. 26, 2010.

(30) Foreign Application Priority Data

Jul. 9, 2010  (KR) .................. 10-2010-0066192

(51) Int. Cl.
*H04B 7/15*  (2006.01)
*H04B 7/04*  (2006.01)
*H04B 7/02*  (2006.01)
*H04B 7/06*  (2006.01)
(Continued)

(52) U.S. Cl.
CPC .............. *H04B 7/0417* (2013.01); *H04B 7/022* (2013.01); *H04B 7/0639* (2013.01); *H04W 72/1231* (2013.01); *H04W 88/085* (2013.01)
USPC ................... 455/501; 455/63.1; 455/562.1

(58) Field of Classification Search
USPC ......... 455/501, 63.1, 67.13, 114.2, 296, 13.3, 455/562.1
See application file for complete search history.

(56) References Cited

U.S. PATENT DOCUMENTS 7,890,130 B2 * 2/2011 Sung et al. ................. 455/522
7,995,536 B2 * 8/2011 Ogawa et al. .............. 370/334
(Continued)

FOREIGN PATENT DOCUMENTS

WO  2007/108629  9/2007

OTHER PUBLICATIONS

PCT International Application No. PCT/KR2011/000606, Written Opinion of the International Searching Authority dated Sep. 30, 2011, 15 pages.

*Primary Examiner* — Dominic E Rego
(74) *Attorney, Agent, or Firm* — Lee, Hong, Degerman, Kang & Waimey

(57) ABSTRACT

The present invention relates to a method for mitigating inter-cell interference in a multi-cell DAS. In one embodiment of the present invention, user equipment estimates an interfering antenna of an adjacent cell on the basis of RS pattern information of the adjacent cell, provided by a base station of a serving cell, or the base station provides the user equipment with information which specifies an interfering cell of the adjacent cell.

16 Claims, 15 Drawing Sheets

(51) Int. Cl.
    *H04W 72/12*      (2009.01)
    *H04W 88/08*      (2009.01)

(56) References Cited

U.S. PATENT DOCUMENTS

| | | | |
|---|---|---|---|
| 8,433,258 B2 * | 4/2013 | Luo et al. | 455/101 |
| 8,467,468 B2 * | 6/2013 | Lee et al. | 375/267 |
| 8,565,208 B2 * | 10/2013 | Shan et al. | 370/341 |
| 8,644,363 B2 * | 2/2014 | Li et al. | 375/145 |
| 2004/0110524 A1 | 6/2004 | Takano et al. | |
| 2004/0209570 A1 * | 10/2004 | Fiore | 455/62 |
| 2007/0049199 A1 | 3/2007 | Lim et al. | |
| 2008/0279317 A1 * | 11/2008 | Lee et al. | 375/346 |
| 2009/0016263 A1 * | 1/2009 | Kishigami et al. | 370/328 |
| 2009/0196162 A1 * | 8/2009 | Sambhwani et al. | 370/201 |
| 2009/0232062 A1 * | 9/2009 | Higuchi et al. | 370/329 |
| 2009/0312047 A1 * | 12/2009 | Satou et al. | 455/522 |
| 2010/0056153 A1 * | 3/2010 | Attar et al. | 455/436 |
| 2010/0069122 A1 * | 3/2010 | Ito | 455/562.1 |
| 2010/0080269 A1 * | 4/2010 | Kim et al. | 375/211 |
| 2010/0222075 A1 * | 9/2010 | Miura | 455/456.1 |
| 2010/0232539 A1 * | 9/2010 | Han et al. | 375/285 |
| 2010/0298016 A1 * | 11/2010 | Madan et al. | 455/501 |
| 2010/0322184 A1 * | 12/2010 | Xiao | 370/330 |
| 2011/0134812 A1 * | 6/2011 | Senarath et al. | 370/280 |
| 2011/0183692 A1 * | 7/2011 | Lee et al. | 455/501 |
| 2011/0243075 A1 * | 10/2011 | Luo et al. | 370/329 |

* cited by examiner

METHOD FOR TRANSCEIVING A SIGNAL, AND BASE STATION AND USER EQUIPMENT FOR SAME

CROSS-REFERENCE TO RELATED APPLICATIONS

This application is the National Stage filing under 35 U.S.C. 371 of International Application No. PCT/KR2011/000606, filed on Jan. 28, 2011, which claims the benefit of earlier filing date and right of priority to Korean Application No. 10-2010-0066192, filed on Jul. 9, 2010, and also claims the benefit of U.S. Provisional Application Ser. No. 61/308,312, filed on Feb. 26, 2010, the contents of which are all incorporated by reference herein in their entirety.

TECHNICAL FIELD

The present invention relates to a method for transceiving a signal in a distributed antenna system (DAS), and more particularly, to a method for reducing interference caused by a neighboring cell in a DAS.

BACKGROUND ART

With the development of the information industry, the technology that can transmit various kinds of large data at high speed has been required. In this respect, a distributed antenna system (DAS) that provides a plurality of distributed antennas within an existing cell has been studied to remove a shade zone and extend coverage.

The distributed antenna system (DAS) uses a plurality of distributed antennas connected with a single base station through a cable or a dedicated line, wherein the single base station manages a plurality of antennas located within a cell at predetermined intervals. The DAS provided with a plurality of antennas located within a cell at predetermined intervals is different from a centralized antenna system (CAS) provided with a plurality of antennas centralized at the center of a cell. Generally, the CAS uses various multi-antenna systems such as an open loop-multi input multi output (OL-MIMO) system, a close loop-single user-multi input multi output (CL-SU-MIMO) system, a close loop-multi user-multi input multi output (CL-MU-MIMO) system, and a multi-base station-multi input multi output (multi-BS-MIMO) system in such a manner that multiple antennas are installed in one base station in a cell based structure of a cellular communication system such as a wideband code division multiple access (WCDMA) system, a high speed packet access (HSPA) system, a long term evolution (LTE)/long term evolution-advanced (LTE-A) system, and a 802.16 system.

The DAS is different from a femto cell in that all distributed antennas located within a cell are managed by a base station at the center of the cell not each unit of the distributed antennas. Also, the DAS is different from a multi-hop relay system or ad-hoc network in that distributed antenna units are connected with one another through a cable or a dedicated line, wherein the multi-hop relay system or ad-hoc network includes a base station connected with a relay station (RS) through a wireless mode. Moreover, the DAS is different from a repeater, which simply amplifies and transmits a signal, in that each of distributed antennas can transmit different signals to different user equipments located near the antennas in accordance with a command of a base station.

This DAS may be regarded as a multiple input multiple output (MIMO) system in that distributed antennas can support a single user equipment or multiple user equipments by transmitting and receiving different data streams at the same time. In view of the MIMO system, the DAS is advantageous in that it can reduce a transmission power as a transmission zone is more reduced than that of the CAS due to distributed antennas distributed at various locations within a cell. Also, the DAS can reduce path loss by reducing a transmission distance between the antenna and the user equipment, thereby enabling high rate transmission of data. As a result, the DAS can enhance transmission capacity and power efficiency of the cellular system, and can satisfy communication throughput of quality more relatively uniform than that of the CAS regardless of user location within the cell. Also, since the base station is connected with a plurality of distributed antennas through a cable or a dedicated line in the DAS, signal loss is reduced, and correlation and interference between the antennas are reduced, whereby a high signal to interference to noise ratio (SINR) can be obtained.

As described above, in order to reduce facility costs of the base station and maintenance costs of a backhaul network in a next generation mobile communication system and at the same time extend service coverage and improve channel capacity and SINR, the DAS can be a new basis of cellular communication by being compatible with the existing CAS or replacing with the CAS.

DISCLOSURE

Technical Problem

Accordingly, an object of the present invention devised to solve the aforementioned problems is to provide a method for reducing interference caused by a signal transmitted from an antenna of a neighboring cell in a distributed antenna system (DAS).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In order to reduce inter-cell interference in a multi-cell DAS, the present invention provides a method and user equipment for estimating interference antenna(s) of a neighboring cell on the basis of RS pattern information of the neighboring cell, which is provided from a base station of a serving cell, or a method and base station for providing information specifying interference antenna(s) of the neighboring cell to the user equipment.

In one aspect of the present invention, a method for transmitting a signal in a base station of a certain cell, which includes a plurality of distributed antennas spaced apart from one another at least a predetermined distance, comprises the steps of transmitting first information to a user equipment within the certain cell, the first information being used for specifying a first antenna used for communication with the user equipment among the plurality of distributed antennas within the certain cell; and transmitting second information to the user equipment, the second information being used for specifying a second antenna interfering with the user equipment among a plurality of distributed antennas within a neighboring cell of the certain cell.

In another aspect of the present invention, a base station of a certain cell, which includes a plurality of distributed antennas spaced apart from one another at least a predetermined distance, comprises a transmitter configured to transmit a signal; and a processor configured to control the transmitter to transmit first information to a user equipment within the certain cell, the first information being used for specifying a first antenna used for communication with the user equipment among the plurality of distributed antennas within the certain cell and transmit second information to the user equipment, the second information being used for specifying a second antenna interfering with the user equipment among a plurality of distributed antennas within a neighboring cell of the certain cell.

In still another aspect of the present invention, a method for receiving a signal in user equipment from a base station, which includes a plurality of distributed antennas spaced apart from one another at least a predetermined distance, comprises the steps of receiving first information used for specifying a first antenna used for communication with the user equipment among the plurality of distributed antennas within the base station;

receiving second information used for specifying a second antenna interfering with the user equipment among a plurality of distributed antennas within a neighboring base station of the base station; and generating channel quality information on the basis of the first information and the second information.

In further still another aspect of the present invention, a user equipment receiving a signal from a base station of a certain cell, which includes a plurality of distributed antennas spaced apart from one another at least a predetermined distance, comprises a receiver configured to receive the signal; and a processor configured to control the receiver to receive first information used for specifying a first antenna used for communication with the user equipment among the plurality of distributed antennas within the certain cell and receive second information used for specifying a second antenna interfering with the user equipment among a plurality of distributed antennas within a neighboring cell of the certain cell, and configured to generate channel quality information on the basis of the first information and the second information.

The second information may include information on a reference signal pattern of the neighboring cell.

The second information may include information indicating the number and index of the second antenna within the neighboring cell.

The first information may include information indicating the number and index of the first antenna within the certain cell.

The user equipment may calculate an interference signal from the second antenna on the basis of the first information and the second information.

The aforementioned technical solutions are only a part of the preferred embodiments of the present invention, and various modifications to which technical features of the present invention are applied could be understood by the person with ordinary skill in the art to which the present invention pertains, based on the following detailed description of the present invention.

Advantageous Effects

According to the embodiments of the present invention, it is advantageous in that interference on a user equipment from a signal of an antenna which belongs to a neighboring cell in a distributed antenna system can be reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on IEEE 802.16 system, the IEEE 802.16 system is only exemplary and the following description may be applied to various wireless communication systems including a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

A wireless communication system to which the present invention may be applied includes at least one base station (BS) 11. Each base station provides a communication service to a user equipment (UE) located at a specific local area (generally referred to as 'cell'). The user equipment may be fixed or have mobility, and its examples include various equipments that transmit and receive user data and/or various kinds of control information to and from the base station through communication with the base station. The user equipment (UE) may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, the base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Figure 1:
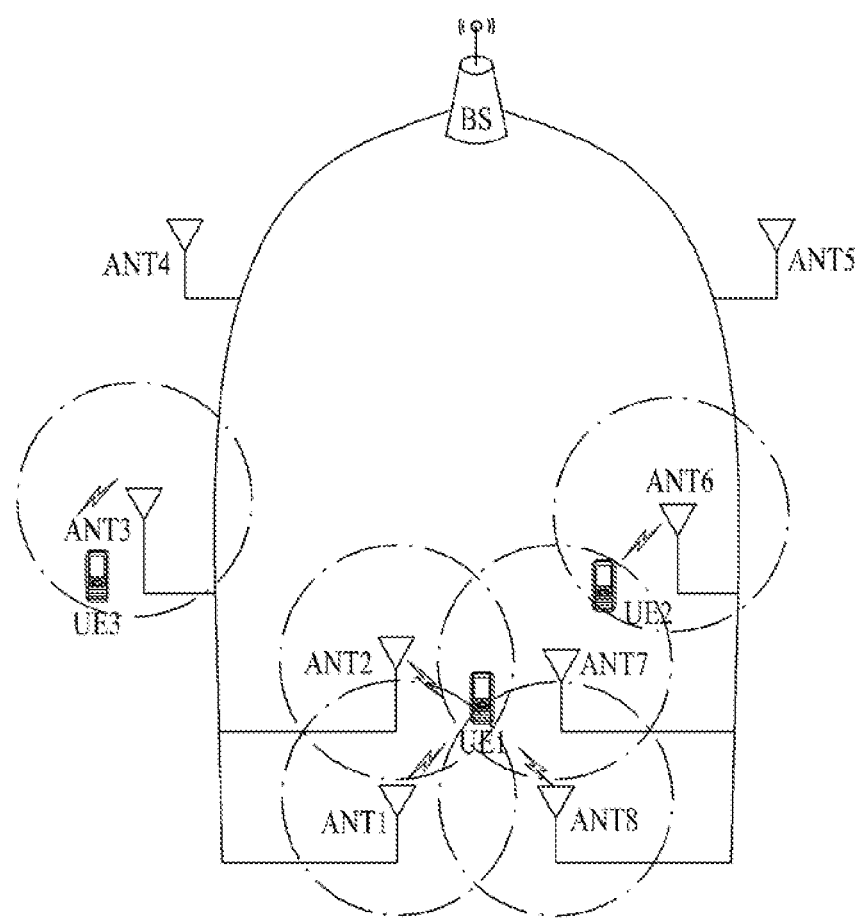
FIG. 1 is a diagram illustrating an example of a DAS structure to which the present invention is applied.

FIG. 1 is a diagram illustrating an example of a DAS structure to which the present invention is applied. The base station illustrated in FIG. 1 includes a plurality of antennas located at the center of a cell in accordance with a CAS. However, for conciseness of description, DAS antennas are only illustrated in FIG. 1.

Referring to FIG. 1, in a DAS, a plurality of antennas connected with a single base station, which is located within a cell, through a cable are distributed at various locations within the cell. This DAS may be configured in various manners depending on the number and location of antennas. For example, a plurality of antennas may be distributed within the cell at constant intervals or two or more antennas may be centralized at a specific place. If a coverage area of each of the distributed antennas are overlapped with that of another distributed antenna, signal transmission of rank 2 or more may be performed in the DAS regardless of the location of the distributed antennas within the cell. Rank means the number of data streams that can be transmitted at the same time through one or more antennas.

Referring to FIG. 1, one base station that supports one cell zone is connected with a total of eight antennas through a cable, wherein the respective antennas may be located at constant intervals or various intervals within the cell. In the DAS, not all the antennas connected with the base station are needed to be used, and a proper number of antennas may be used based on their signal transmission range, an overlap level of coverage and interference with their neighboring antenna, and the distance with the user equipment.

For example, if three user equipments (UE 1 to UE 3) are located within the cell and the UE 1 is located within a signal transmission range of the antennas 1, 2, 7 and 8 as illustrated in FIG. 1, the UE 1 may receive a signal from one or more of the base station antennas 1, 2, 7 and 8. On the other hand, in view of the UE 1, it is likely that path loss may occur in the antennas 3, 4, 5 and 6 and power consumption may be increased therein due to a long distance between the corresponding antennas and the user equipment UE 1, and the signals transmitted from the antennas 3, 4, 5 and 6 may be small values that may be disregarded.

For another example, since the UE 2 is located in a portion where the signal transmission range of the antenna 6 is overlapped with that of the antenna 7, the signals transmitted through the other antennas except for the antennas 6 and 7 may be small or weak values that may be disregarded. Also, since the UE 3 is located within a neighboring distance of the antenna 3, it may exclusively receive the signal transmitted through the antenna 3.

As illustrated in FIG. 1, if a plurality of antennas are spaced apart from one another within the cell of the DAS, the DAS is operated like a MIMO system. The base station may perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may include various data streams for transmission per user equipment during communication with a single user/multiple users. Also, various antennas or antenna groups may be allocated to user equipments located within the cell supported by the base station in the DAS. A specific antenna or antenna group, which performs communication with a user equipment, may be defined depending on the location of the corresponding user equipment located within the cell. Alternatively, the antenna or antenna group, which performs communication with a user equipment, may adaptively be changed depending on movement of the user equipment within the cell.

Figure 2:
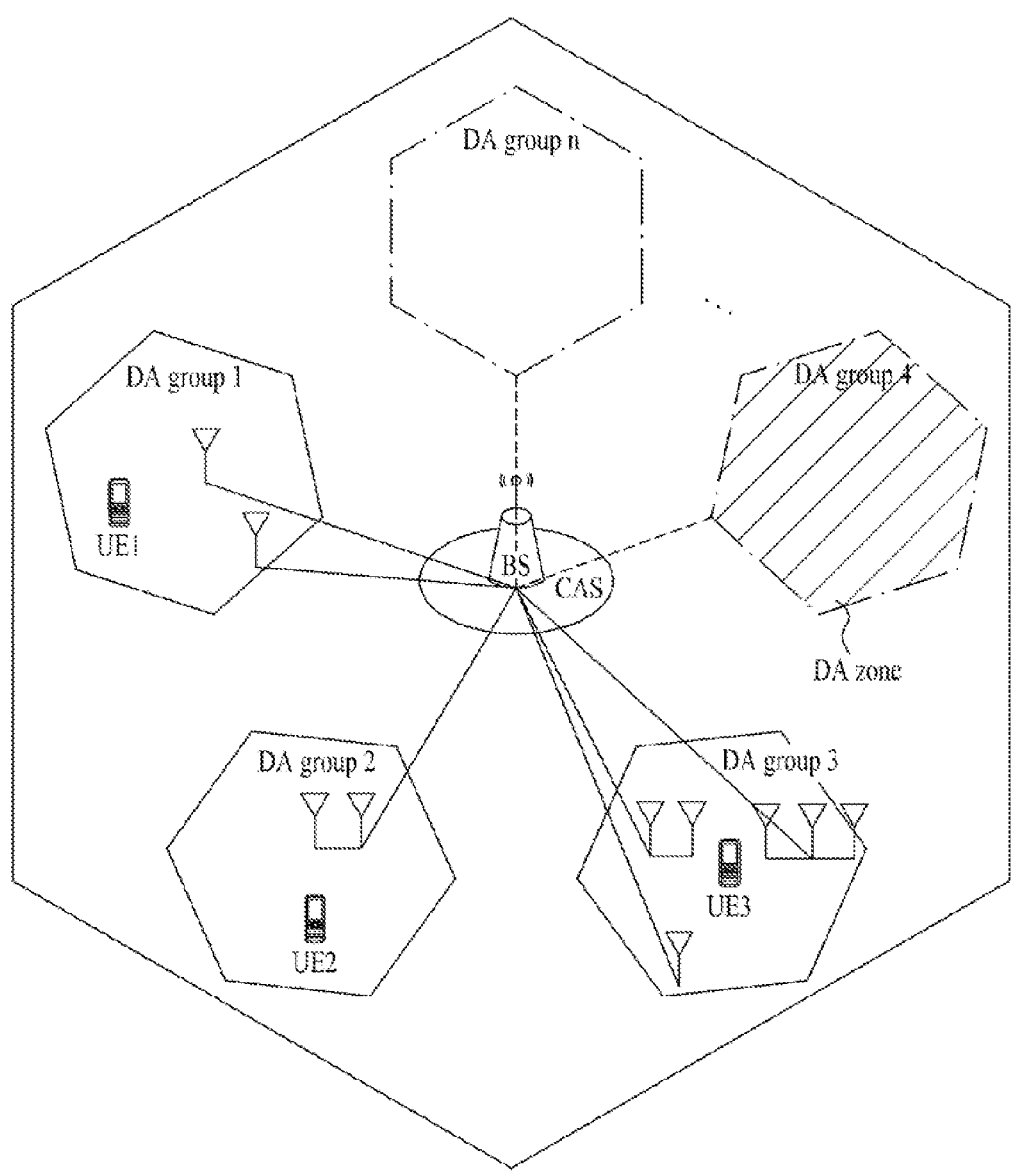
FIG. 2 is a diagram illustrating another example of a DAS structure to which the present invention is applied.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone.

The DAs are configured by one or more antennas connected from the base station through one cable, and may be used to refer to antenna node for DAS or antenna node. In other words, the antenna node includes one or more antennas, and the antennas constituting each antenna node are connected with one another through a cable. The one or more DAs form one DA group, thereby forming a DA zone.

The DA group, which includes one or more DAs, may variably be configured depending on the location or receiving status of the user equipment, or may fixedly be configured by the number of maximum antennas used in MIMO. According to the IEEE 802.16m, the number of maximum antennas is 8Tx. The DA zone is defined by the range that the antennas constituting the DA group can transmit or receive a signal. The cell zone illustrated in FIG. 2 includes n number of DA zones. The user equipment that belongs to the DA zone may perform communication with one or more of the DAs constituting the DA zone, and the base station may increase a transmission rate by using the DAs and the CAs at the same time during signal transmission to the user equipment belonging to the DA zone.

A CAS that includes a DAS is illustrated in FIG. 2, whereby the base station and the user equipment may use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

In the meantime, a cell area where the base station provides a service may be divided into a plurality of smaller areas to improve system throughput. Each of the smaller areas may be referred to as cell, sector or segment. In the IEEE 802.16 system, cell identity (Cell_ID or IDCell) is given based on the whole system, whereas sector or segment identity is given based on the cell area where the base station provides a service, and has a value of 0 to 2. The user equipments are generally distributed in the wireless communication system, and may be fixed or moved. Each of the user equipments may perform communication with one or more base stations through an uplink (UL) and a downlink (DL) at a random moment.

FIG. 2 illustrates a CAS that includes a DAS such that the base station and the user equipment may use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

Figure 3:
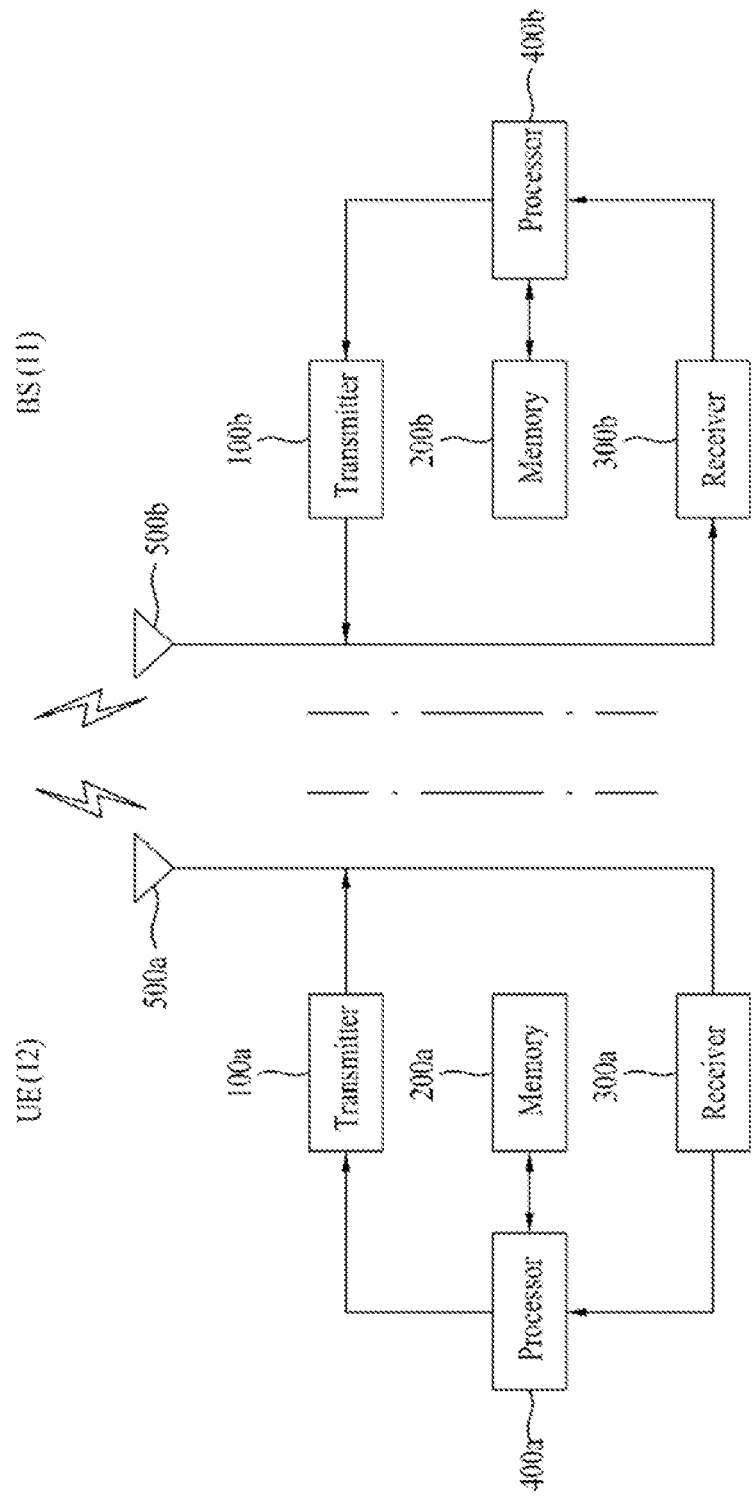
FIG. 3 is a block diagram illustrating elements of a user equipment and a base station, which perform the present invention.

FIG. 3 is a block diagram illustrating elements of a user equipment and a base station, which perform the present invention.

The user equipment 12 is operated as a transmission apparatus on the uplink and as a reception apparatus on the downlink. The base station 11 is operated as a reception apparatus on the uplink and as a transmission apparatus on the downlink.

The user equipment 12 and the base station 11 respectively include an antenna 500a, 500b for receiving information and/or data, signal, message, etc., a transmitter 100a, 100b transmitting a message by controlling the antenna, a receiver 300a, 300b receiving a message by controlling the antenna, and a memory 200a, 200b storing various kinds of information related to communication within a wireless communication system. Also, the user equipment 12 and the base station 11 respectively include a processor 400a, 400b configured to perform the present invention by controlling the transmitter, the receiver and the memory included in the user equipment 12 or the base station 11. The transmitter 100a, 100b, the memory 200a, 200b, the receiver 300a, 300b, the processor 400a, 400b and the antenna 500a, 500b within the user equipment or the base station may be configured to mutually interact with one another. The transmitter 100a, the receiver 300a, the memory 200a, and the processor 400a within the user equipment 12 may respectively be implemented by a separate chip as independent elements, or may be implemented by two or more chips. The transmitter and the receiver may be incorporated into one, whereby one transceiver may be implemented within the user equipment or the base station. The antenna 500a, 500b serves to transmit a signal generated by the transmitter 100a, 100b to the outside, or receive a radio signal from the outside and transfer the received radio signal to the receiver 300a, 300b. Transmission and reception modules that support multi-input multi-output (MIMO) function for data transmission and reception based on multiple antennas may be connected with two or more antennas.

The processor 400a, 400b generally controls the overall operation of various modules within the user equipment 12 or the base station 11. In particular, the processor 400a, 400b may perform various control functions for performing the present invention, a variable Medium Access Control (MAC) frame control function based on service characteristics and a propagation environment, a power saving mode for controlling an idle mode operation, a handover (HO) function, an authentication and encryption function, etc. The processor 400a, 400b may be referred to as a controller, a microcontroller, a microprocessor, and a microcomputer. Meanwhile, the processor 400a, 400b may be implemented by hardware, firmware, software, or their combination. If the present invention is implemented by hardware, application specific integrated circuits (ASICs), digital signal processors (DSPs), digital signal processing devices (DSPDs), programmable logic devices (PLDs), and field programmable gate arrays (FPGAs), which are configured to perform the present invention, may be provided in the processor 400a, 400b. Meanwhile, if the present invention is implemented by firmware or software, the firmware or software may be configured to include a module, a procedure, or a function, which performs functions or operations of the present invention. The firmware or software configured to perform the present invention may be provided in the processor 400a, 400b or may be stored in the memory 200a, 200b and then may be driven by the processor 400a, 400b.

The transmitter 100a, 100b performs predetermined coding and modulation for data, which are scheduled from the processor 400a, 400b or a scheduler connected with the processor and then transmitted to the outside, and then transfers the coded and modulated data to the antenna 500a, 500b. For example, the transmitter 100a, 100b converts data streams intended for transmission into K number of signal streams through de-multiplexing, channel coding, modulation, etc. The K number of signal streams are transmitted through a transmitting processor within the transmitter and the transmitting antenna 500a, 500b in due order. The transmitter 100a, 100b and the receiver 300a, 300b of the user equipment 12 and the base station 11 may be configured differently depending on a processing procedure of transmitting signals and receiving signals.

Figure 4:
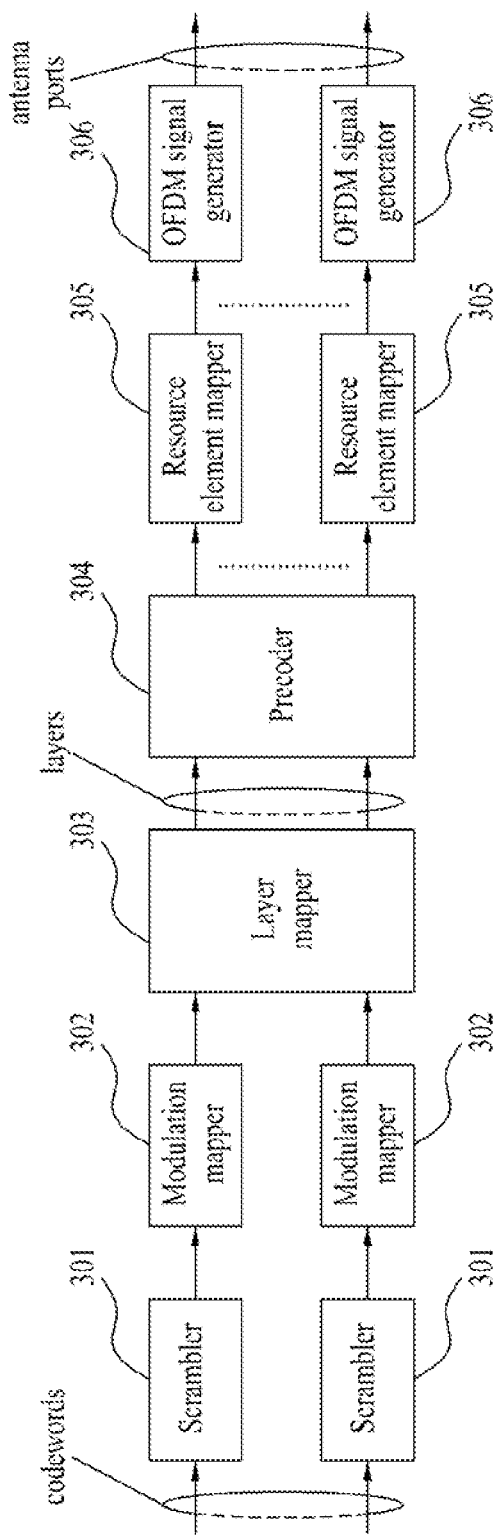
FIG. 4 is a diagram illustrating a signal processing procedure based on an orthogonal frequency division multiple access (OFDMA) system.

FIG. 4 is a diagram illustrating a signal processing procedure based on an orthogonal frequency division multiple access (OFDMA) system.

The transmitter within the user equipment or the base station may transmit one or more codewords. The one or more codewords may respectively be scrambled by a scrambler 301, and may be modulated into complex symbols by a modulation mapper 302. A layer mapper 303 maps the complex symbols into one or more transmission layers. The scrambler 301, the modulation mapper 302, and the layer mapper 303 may be implemented as encoders (not shown). The encoder may form coded data by encoding data streams intended for transmission in accordance with a predetermined coding mode, and may arrange the coded data as symbols indicating the location on signal constellation by modulating them. Also, the encoder may define a layer of input symbols to allow a precoder 304 to distribute antenna-specific symbols into a path of a corresponding antenna.

The precoder 304 outputs the complex symbols of the transmission layer as complex symbols per antenna by multiplying them by a predetermined precoding matrix W selected in accordance with a channel status. The precoder 304 may use both a codebook scheme and a non-codebook scheme. The complex symbols per antenna are respectively mapped into time-frequency resource elements, which will be used for transmission, by a resource element mapper 305. The complex symbols per antenna, which are mapped into the time-frequency resource elements, are modulated into OFDM symbols by an OFDM signal generator 306 and then transmitted to each antenna port in the form of OFDM symbols per antenna port. The OFDM signal generator may perform inverse fast fourier transform (IFFT) for the input symbols, and cyclic prefix (CP) may be inserted into the time domain symbols for which IFFT has been performed. The OFDM symbols are transmitted through each antenna.

Although the orthogonal frequency division multiple access (OFDMA) mode of the signal processing procedure has been exemplarily described in FIG. 4, the user equipment may transmit uplink signals processed by a single carrier frequency division multiple access (SC-FDMA) mode to the base station. The transmitter of the SC-FDMA mode may include one scrambler 301, one modulation mapper 302, a precoder 304, and one resource element mapper 305. The scrambler 301 of the user equipment scrambles the transmitting signal using a user equipment-specific scrambling signal, and the modulation mappper 302 modulates the scrambled signal into complex symbols based on a binary phase shift keying (BPSK) mode, a quadrature phase shift keying (QPSK) mode, or a 16 quadrature amplitude modulation (QAM) mode depending on types of the transmitting signal and/or the channel status. After the modulated complex symbols are precoded by the precoder 304, they are mapped into the time-frequency resource elements to be used for actual transmission by the resource element mapper 305. The signals mapped into the resource elements may be transmitted to the base station through the antenna in the form of SC-FDMA signal. The user equipment that adopts the SC-FDMA signal processing mode may include an SC-FDMA signal generator converting the signal mapped into the resource elements into SC-FDMA signal.

Although the OFDMA mode is mainly used for downlink transmission due to its improved frequency efficiency and cell capacity, it may be used for uplink transmission. The user equipment may be implemented to adopt both the OFDMA mode and the SC-FDMA signal processing mode, and may be designed to use both the OFDMA mode and the SC-FDMA signal processing mode through switching in accordance with a channel condition.

Although the transmitter 100*a*, 100*b* is provided with the scrambler 301, the modulation mapper 302, the layer mapper 303, the precoder 304, the resource element mapper 305, and the OFDM signal generator 306 in FIG. 4, the processor 400*a*, 400*b* may be provided with the above modules. The transmitter 100*a*, 100*b* and the receiver 300*a*, 300*b* may be configured to modulate OFDM symbol signals into radio frequency (RF) signals and transfer the modulated signals to the antenna 500*a*, 500*b*.

Figure 5:
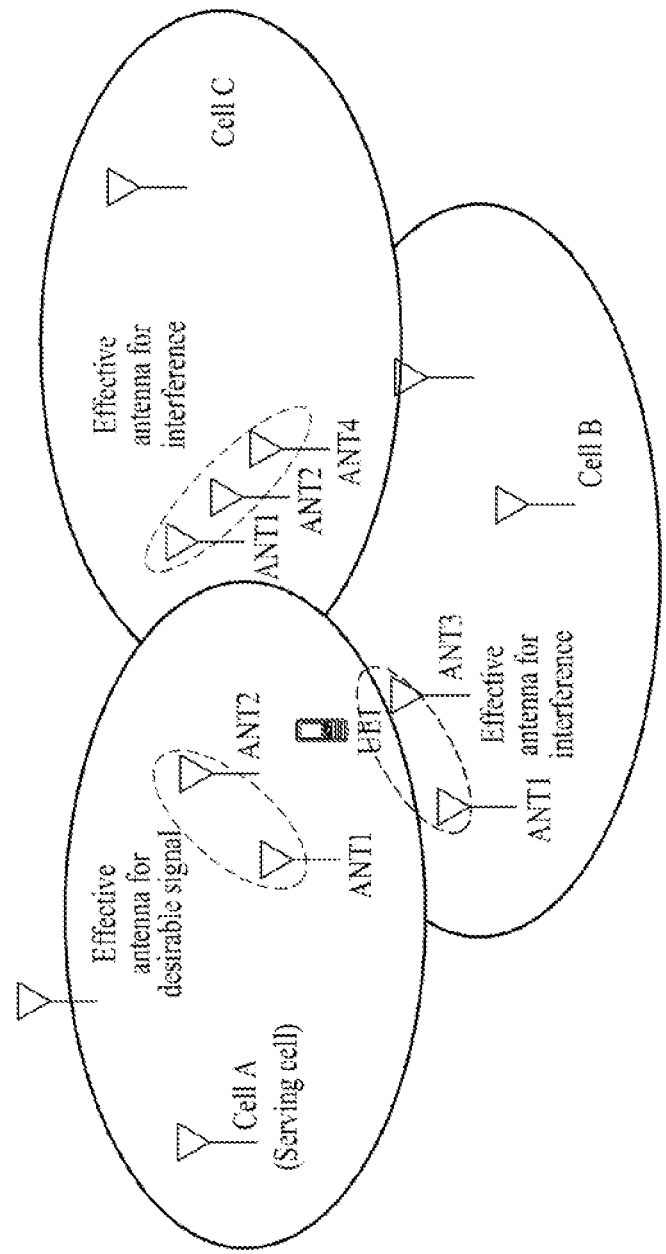
FIG. 5 is a diagram illustrating a multi-cell distributed antenna system.

FIG. 5 is a diagram illustrating a multi-cell distributed antenna system.

Each base station of the distributed antenna system according to the present invention provides a communication service to user equipment(s) located at a neighboring cell. In a multi-cell environment, a serving base station and neighboring base stations exist. In view of the user equipment UE1, cell A becomes a serving cell, and the base station belonging to the cell A becomes a serving base station to the UE1. Cells B and C adjacent to the serving cell A become neighboring cells in view of the UE1. In other words, cells which share the base station with the cell to which the user equipment belongs are those corresponding to the serving base station, and cells belonging to the other base stations are those corresponding to the neighboring base stations.

In the DAS, various number of data streams per user equipment during SU/MU MIMO communication may exist. A specific antenna or antenna group may be allocated to each user equipment, wherein the specific antenna or antenna group allocated to the corresponding user equipment may be changed in real-time. Accordingly, when the user equipment enters the cell area where the base station provides a service, a specific antenna or antenna group that can support communication with the corresponding user equipment may be determined, and information on the specific antenna or antenna group may be shared.

Hereinafter, among distributed antennas within a serving cell, the specific antenna or antenna group used for communication with a specific user equipment will be referred to as an effective antenna.

Figure 6:
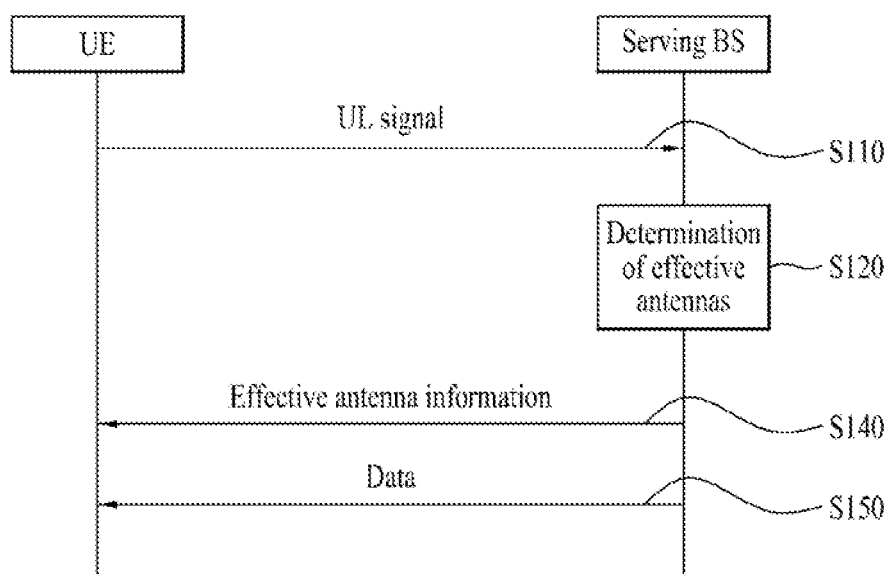
FIG. 6 and FIG. 7 are diagrams illustrating examples of a method for determining an effective antenna through a user equipment within a specific cell in a DAS.
Figure 7:
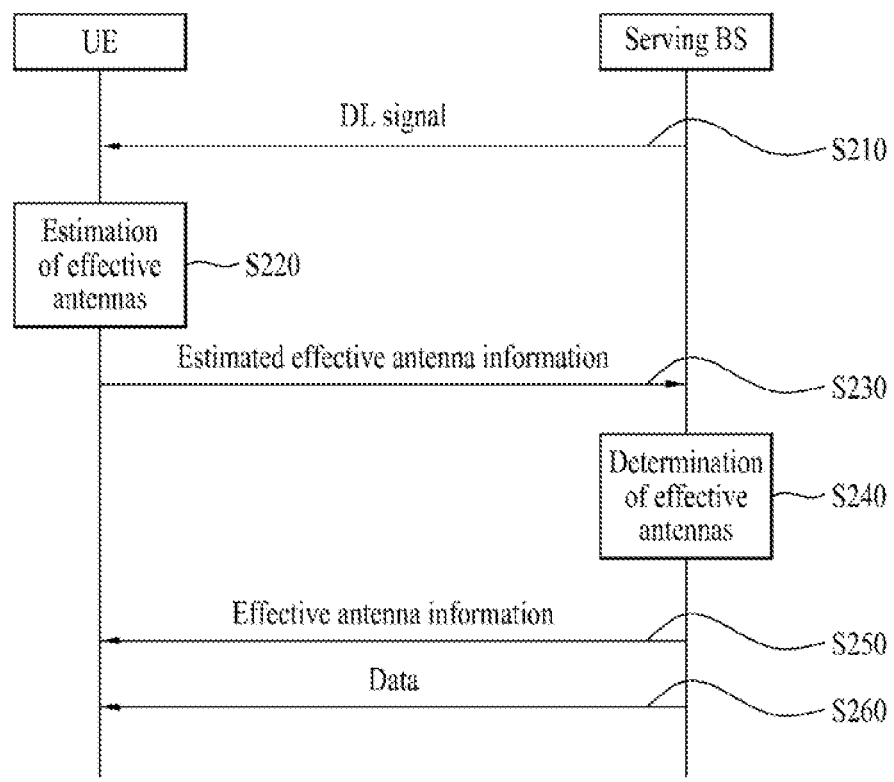

FIG. 6 and FIG. 7 are diagrams illustrating examples of a method for determining an effective antenna through a user equipment within a specific cell in a DAS. In more detail, FIG. 6 illustrates a method for determining an effective antenna through uplink signal measurement, and FIG. 7 illustrates a method for determining an effective antenna through downlink signal measurement.

Embodiment 1 for Determining Effective Antenna

Referring to FIG. 6, in view of a single cell, a DAS base station receives an uplink (UL) signal from the user equipment that has entered the cell area where the base station provides a service (S110). The effective antenna may be determined considering several conditions such as a load state of the serving base station, distribution of user equipments within the cell, and cooperation of the base station with a neighboring cell. Uplink data from the user equipment, pilot (corresponding to reference signal of LTE), feedback information, ACK/NACK (acknowledge/Non-acknowledge) signal for confirmation of data reception, etc. may be used as the UL signal used for determination of the effective antenna.

The base station determines the effective antenna(s) for the user equipment among the entire antennas of the cell on the basis of the UL signal (S120). The base station may finally determine effective antenna(s) which will be used for actual uplink signal transmission per user equipment (SU-MIMO) or user equipment group (MU-MIMO).

The base station transmits information on the determined effective antenna(s) to each user equipment or user equipment group (S140). Also, the base station may transmit corresponding downlink data to a corresponding user equipment or corresponding user equipment group through the determined effective antenna(s) (S150).

Information on the number of effective antennas for a specific user equipment or a user equipment group, effective antenna index information to be used by the base station for a specific user equipment or a specific user equipment group, and signal receiving strength information per effective antenna may be used as information on the effective antenna(s) (hereinafter, referred to as effective antenna information). Accordingly, the base station may transmit at least one of the information on the number of effective antennas, the effective antenna index information, and the signal receiving strength information to the corresponding user equipment as the effective antenna information.

Since the effective antenna information on the corresponding user equipment may be varied depending on the location of the user equipment and the distance between the user equipment and the antenna within the base station, the effective antenna information per user equipment may be independent. Accordingly, the base station may transmit the effective antenna information at a predetermined period, or may transmit the effective antenna information non-periodically at a specific time such as a request of the user equipment or entrance of the user equipment into the cell.

The user equipment may estimate a channel per one or more effective antennas for the user equipment on the basis of the effective antenna information, generate channel quality information (channel status information) for the estimated channel, and feed the generated channel quality information back to the base station. A channel quality indicator (CQI), a precoding matrix index (PMI), rank information (RI), and a covariance matrix may be used as the channel quality information. The base station may use the fed back channel quality information for selection of the precoding matrix, calculation of channel quality, and determination of a modulation and coding scheme (MCS) level. The base station may perform coding and modulation for transmission data in accordance with the determined MCS level, precode the transmission data with the selected precoding matrix, and transmit the transmission data to the corresponding user equipment (S150).

Referring to FIG. 6, in view of the single cell, the DAS base station receives an uplink (UL) signal from the user equipment that has entered the cell area where the base station provides a service (S110). The effective antenna may be determined considering several conditions such as a load state of the serving base station, distribution of the user equipment within the cell, and cooperation of the serving base station with a neighboring cell. Uplink data from the user equipment, pilot (corresponding to reference signal of LTE), feedback information, ACK/NACK (acknowledge/Non-acknowledge) signal for confirmation of data reception, etc. may be used as the UL signal used for determination of the effective antenna.

The base station determines the effective antenna for the user equipment among the entire antennas of the cell on the basis of the UL signal (S120). The base station may finally determine effective antenna(s) which will be used for actual uplink signal transmission per user equipment (SU-MIMO) or user equipment group (MU-MIMO).

The base station transmits the information on the determined effective antenna(s) to each user equipment or user equipment group (S140). Also, the base station may transmit corresponding downlink data to the corresponding user equipment or the corresponding user equipment group through the determined effective antenna(s) (S150).

The base station processor 400b of the serving cell may generate at least one of the information on the number of the effective antennas, the effective antenna index information, and the signal receiving strength information as effective antenna information. The base station processor 400b may control the transmitter 100b to transmit the effective antenna information to the corresponding user equipment. The effective antenna information may be transmitted to the corresponding user equipment through the effective antenna(s) of a plurality of distributed antennas within the serving cell.

The base station processor 400b may control the transmitter 100b to transmit the effective antenna information at a predetermined period, or may control the transmitter 100b to transmit the effective antenna information non-periodically at a specific time such as request of the user equipment or entrance of the user equipment into the cell.

The receiver 300a of the user equipment receives the effective antenna information and provides the received effective antenna information to the processor 400a of the user equipment. The user equipment processor 400a may be configured to estimate a channel status per one or more effective antennas for the user equipment on the basis of the effective antenna information. Also, the user equipment processor 400a may generate channel quality information (referred to as channel status information), which may indicate the estimated channel status, and may provide the generated channel quality information to the transmitter 100a of the user equipment. The user equipment transmitter 100a may feed the channel quality information back to the base station under the control of the user equipment processor 400a.

The base station receiver 300b receives the feedback information and provides the received feedback information to the base station processor 400b. The base station processor 400b may select a precoding matrix on the basis of the channel quality information fed back from the user equipment. Also, the base station processor 400b may calculate quality of a channel formed between the effective antenna(s) of the serving cell and the user equipment on the basis of the channel quality information, and may determine a modulation and coding scheme (MCS) level corresponding to the calculated channel quality value. The base station processor 400b controls the base station transmitter 100b to code and modulate transmission data, which will be transmitted to the user equipment, in accordance with the determined MCS level. The base station transmitter 100b may code transmission data streams in accordance with a coding level of the determined MCS level under the control of the base station processor 400b. The base station modulation mapper 302 is configured to modulate the transmission data in accordance with the determined MCS level under the control of the base station processor 400b. The precoder 304 of the base station is configured to precode the transmission data by using the determined precoding matrix under the control of the base station processor 400b. The precoded transmission data are transmitted to the corresponding user equipment through the corresponding antenna.

Embodiment 2 for Determining Effective Antenna

Referring to FIG. 7, in view of a single cell, the user equipment receives a downlink (DL) signal transmitted through one or more distributed antennas within the serving cell (S210). Downlink data from the base station, pilot (corresponding to reference signal of LTE), ACK/NACK (acknowledge/Non-acknowledge) signal for confirmation of data reception, etc. may be used as the DL signal transmitted from the base station.

The effective antenna that affects the user equipment is estimated on the basis of the DL signal (S220). For example, the user equipment may estimate a channel formed between the user equipment and the antenna of the base station by using a pilot pattern within a DL frame, and may estimate antenna(s) used for transmission of the pilot pattern.

The user equipment may feed information on the estimated antenna back to the base station as effective antenna information (S230). Information on the number of the effective antennas, effective antenna index information, and signal receiving strength information may be used as information on the effective antenna(s) (hereinafter, referred to as effective antenna information). Accordingly, the user equipment may feed at least one of the information on the number of the effective antennas, the effective antenna index information, and the signal receiving strength information back to the base station as the effective antenna information.

The base station may determine actual effective antenna(s) which will actually be used for downlink signal transmission to the user equipment, on the basis of the fed back effective antenna information (S240). Although the base station may transmit data by using the effective antenna(s) estimated by the user equipment, it may transmit the data by selecting another antenna instead of the effective antenna(s) estimated by the user equipment, in accordance with a status of the wireless system, such as load status of the network.

The base station may transmit information on the determined actual effective antenna(s) to the user equipment (S250). The base station may transmit the corresponding downlink data to the corresponding user equipment or the corresponding user equipment group through the determined effective antenna(s) (S260).

For reference, the user equipment may estimate the channel by using the received DL signal, and may generate channel quality information by using the estimated channel to feed the generated channel quality information back to the base station. The base station may use the fed back channel quality information for determination (S240) of the effective antenna(s). For example, the base station may determine transmitting antenna(s) which will actually be used for each user equipment or user equipment group, whereby throughput of the whole wireless system may be increased by using the channel quality information that includes at least one of estimated effective antenna information transmitted from the user equipment within coverage of the base station, CQI, PMI, RI, and covariance matrix information.

The base station may use the channel quality information to select the precoding matrix, calculate channel quality, and determine a modulation and coding scheme (MCS) level. The base station may code and modulate the transmission data in accordance with the determined MCS level, precode the transmission data in accordance with the selected precoding matrix and transmit the transmission data to the corresponding user equipment (S260).

In view of the single cell, the user equipment receiver 300a receives the DL signal transmitted through one or more distributed antennas within the serving cell and provides the received DL signal to the user equipment processor 400a.

The user equipment processor 400a estimates an effective antenna that affects the user equipment, on the basis of the DL signal. For example, the user equipment processor 400a may estimate the channel formed between the user equipment and the antenna of the base station by using a pilot pattern within a DL frame, and may estimate antenna(s) used for transmission of the pilot pattern.

The user equipment processor 400a may generate effective antenna information specifying the estimated antenna. The transmitter 100a of the user equipment may feed the effective antenna information back to the base station under the control of the user equipment processor 400a. The user equipment processor 400a may generate the effective antenna information to include at least one of the information on the number of the effective antennas, the effective antenna index information and the signal receiving strength information.

The base station receiver 300b receives the effective antenna information fed back from the user equipment and provides the received effective antenna information to the base station processor 400b. The base station processor 400b may determine actual effective antenna(s) which will actually be used for downlink signal transmission to the user equipment, on the basis of the effective antenna information. Although the base station processor 400b may control the base station transmitter 100b to transmit data by using the effective antenna(s) estimated by the user equipment, it may control the base station transmitter 100b to select another antenna instead of the effective antenna(s) estimated by the user equipment and transmit the data through the selected antenna, in accordance with a status of the wireless system, such as load status of the network.

The base station processor 400b may control the base station transmitter 100b to transmit information on the determined actual effective antenna(s) to the user equipment. The base station processor 400b may control the base station transmitter 100b to transmit the corresponding downlink data to the corresponding user equipment or the corresponding user equipment group through the determined effective antenna(s).

For reference, the user equipment processor 400a may estimate the channel by using the received DL signal, and may generate channel quality information by using the estimated channel. The user equipment transmitter 100a may feed the generated channel quality information back to the base station under the control of the user equipment processor 400a. The base station processor 400b may use the fed back channel quality information for determination of the effective antenna(s) which will be used for actual transmission.

The base station processor 400b may use the channel quality information to select the precoding matrix, calculate channel quality, and determine a modulation and coding scheme (MCS) level. The base station transmitter 100b is configured to code and modulate transmission data, which will be transmitted to the user equipment, in accordance with the determined MCS level, under the control of the base station processor 400b. The base station modulation mapper 302 modulates the transmission data in accordance with a modulation level corresponding to the determined MCS level, under the control of the base station processor 400b. The base station precoder 304 precodes the transmission data in accordance with the selected precoding matrix under the control of the base station processor 400b. The precoded transmission data are transmitted to the corresponding user equipment through the determined actual transmitting antenna.

Meanwhile, in the multi-cell environment, the user equipment located at the cell edge may be affected by the transmitting signal of the antenna within the neighboring cell as well as the transmitting signal of the antenna within the serving cell. Accordingly, the user equipment may be affected by the signal of the neighboring cell at the cell edge. Referring to FIG. 5, for example, the base station of the serving cell A intends to transmit a signal to the UE1 through an effective antenna group configured by ANT1 and ANT2 of the distributed antennas of the cell A. However, the UE1 receives the signal from the effective antenna group configured by ANT1 and ANT2 of the cell A and is affected by strong interference from transmitting signals of ANT1 and ANT3 of cell B and from transmitting signals of ANT1, ANT2 and ANT4 of cell C. In order to receive an effective signal from the ANT1 and the ANT2 of the cell A, the user equipment UE1 should remove interference from the cells B and C. In the DAS, since each cell includes distributed antennas spaced apart from one another at a predetermined distance or more, antenna(s) that affect(s) a specific user equipment may be varied depending on the location of the user equipment and the location and number of distributed antennas of the neighboring cell.

Considering features of the DAS, the present invention suggests a method for reducing inter-cell interference in an effective interference antenna DAS that affects a specific user equipment, among distributed antennas of a neighboring cell. In accordance with the embodiments of the present invention, the user equipment of the user equipment in a multi-cell DAS receives information on effective interference antenna(s), which interfere(s) with the user equipment, from the base station, or estimates the information from a downlink signal from the base station. Hereinafter, information on effective interference antenna(s) of another cell, which interfere(s) with a specific user equipment, will be referred to as effective interference antenna information. The effective interference antenna information according to the present invention will be described as follows.

The Number of Effective Interference Antennas

Since the neighboring cell is operated by a fixed antenna in the CAS, the user equipment of the serving cell may remove interference on the basis of the operation of the neighboring cell. Unlike the CAS, since each cell includes various antennas in the DAS and includes various effective antennas correspondingly, a problem may occur when the user equipment measures interference of the neighboring cells and feeds information on the measured interference back to the base station. Accordingly, in order that the user equipment measures signal interference from the neighboring cell in the DAS, in the present invention, the base station provides the user equipment with information on effective interference antenna(s) of the neighboring cell, which interfere(s) with the user equipment, or the user equipment estimates/calculates the information on effective interference antenna(s) of the neighboring cell on the basis of the signal from the base station.

The user equipment according to the present invention may transmit PMI causing the strongest interference or PMI causing the weakest interference to the base station by using the number of effective interference antennas in the multi-cell environment. The base station that has received the PMI causing the strongest interference may remove inter-cell interference for the user equipment by using PMI except for the corresponding PMI. On the other hand, the base station that has received the PMI causing the weakest interference may remove inter-cell interference for the user equipment by using the corresponding PMI. Referring to FIG. 5, it is assumed that there are three DAS cells each having four distributed antennas. The UE1 belonging to the cell A receives a desired signal through the effective antenna group configured by ANT1 and ANT2. In this case, the user equipment may select the best PMI from 2Tx based codebook and transmit the selected PMI to the base station of the serving cell. Also, the UE1 is affected by strong interference from the effective antenna group configured by two distributed antennas from the cell B and also affected by strong interference from the effective antenna group configured by three distributed antennas from the cell C. The present invention provides effective interference antenna information to the user equipment so that the UE1 may measure interference from the DAS cells B and C and feed back the worst/best companion PMI corresponding to the measured interference. In other words, the UE1 may select the PMI corresponding to the effective antenna group configured by two distributed antennas from the cell B, from the 2Tx based codebook. Likewise, the UE1 may select the PMI corresponding to the effective antenna group configured by three distributed antennas from the cell C, from the 3Tx based codebook. The base station that has received the worst/best companion PMI may select a PMI, which may minimize interference, on the basis of the worst/best companion PMI and precode the transmission data to the UE1.

Effective Interference Antenna Index

In order that the user equipment effectively measures an interference signal, information on a corresponding effective interference antenna index is required in addition to information on the number of effective interference antennas of a neighboring cell. Each distributed antenna port of each cell transmits a reference signal in each of different time/frequency areas (including all of TDM/FDM/CDM modes). Accordingly, it may be difficult to measure exact interference through only information as to how many distributed antennas from the neighboring cell constitute an effective interference antenna group. Accordingly, the present invention provides information on substantial index of the effective interference antenna to the user equipment. The base station may transmit the effective interference antenna index information to the user equipment, and the user equipment may estimate the effective interference antenna index information on the basis of the downlink signal from the base station.

For example, referring to FIG. 5, it is assumed that there are three DAS cells each having four distributed antennas. The UE1 is affected by strong interference from the effective antenna group configured by ANT1 and ANT3 of four distributed antennas from the cell B which is the neighboring cell and also affected by strong interference from the effective antenna group configured by ANT1, ANT2 and ANT4 of four distributed antennas from the cell C. If the user equipment knows index information on antennas belonging to the effective interference antenna group of each neighboring cell, it is advantageous in that the user equipment may measure interference of the neighboring cell more exactly.

Reference Signal Pattern Information of Neighboring Cell

The present invention provides information on a reference signal (RS) pattern of a neighboring cell to the user equipment to exactly measure the neighboring cell. The user equipment may receive the RS pattern information from the base station or estimate the RS pattern information on the basis of the downlink signal from the base station. The RS pattern of the neighboring cell may previously be defined implicitly for cell ID or may directly be notified explicitly from the base station of the serving cell to the user equipment. The user equipment may calculate strength of interference and information on a corresponding PMI by measuring time/frequency areas in which the corresponding RS is transmitted, on the basis of the RS pattern information together with the number of the aforementioned effective interference antennas and index information.

The interference strength and/or the corresponding PMI, which is exactly calculated, is advantageous in that it may allow the multi-cell DAS to efficiently perform coordinated scheduling (CS)/beamforming scheme (BS) or joint processing (JP) between cells.

The base station of the present invention may provide all or some of the aforementioned information to the user equipment. Alternatively, the user equipment of the present invention may estimate all or some of the aforementioned information from the downlink signal from the base station. Hereinafter, embodiments for reducing inter-cell interference in a DAS by sharing the information on the number of the aforementioned effective interference antennas, the effective interference antenna index information, and the RS pattern information of the neighboring cell between the base station and the user equipment will be described with reference to FIG. 8 to FIG. 11.

The base station processor 400*b* of the present invention may be configured to generate at least one of the effective interference antenna information, the effective interference index information, and the RS pattern of the neighboring cell. Also, the base station processor 400*b* may control the base station transmitter 100*b* to transmit the effective interference antenna information. The processor 400*a* of the user equipment, which has received the effective interference antenna information, may generate channel quality information by using the effective interference antenna information, and may control the transmitter 100*a* of the user equipment to feed the generated channel quality information back to the serving cell. Also, the processor 400*a* of the user equipment may directly estimate some of the information on the effective interference antenna(s) by using the downlink signal of the serving cell. For example, if the base station of the serving cell receives only the RS pattern information of the neighboring cell from the effective interference antenna information, the processor 400*a* of the user equipment may acquire the RS of the neighboring cell by using the RS pattern information of the neighboring cell and estimate the effective interference antenna(s) of the neighboring cell on the basis of the RS. The processor 400*a* of the user equipment may use the effective interference antenna information, which is provided from the base station or directly estimated by the user equipment, to estimate a channel formed between the user equipment and the antenna(s) of the serving cell or the neighboring cell, and may generate channel quality information on the basis of the estimated channel status. The channel quality information may be used to reduce interference of the neighboring cell for the user equipment.

FIG. 8 to FIG. 11 are diagrams illustrating embodiments of a method for reducing inter-cell interference in a multi-cell DAS.

Embodiment 1 for Removing Inter-DAS Cell Interference

Figure 8:
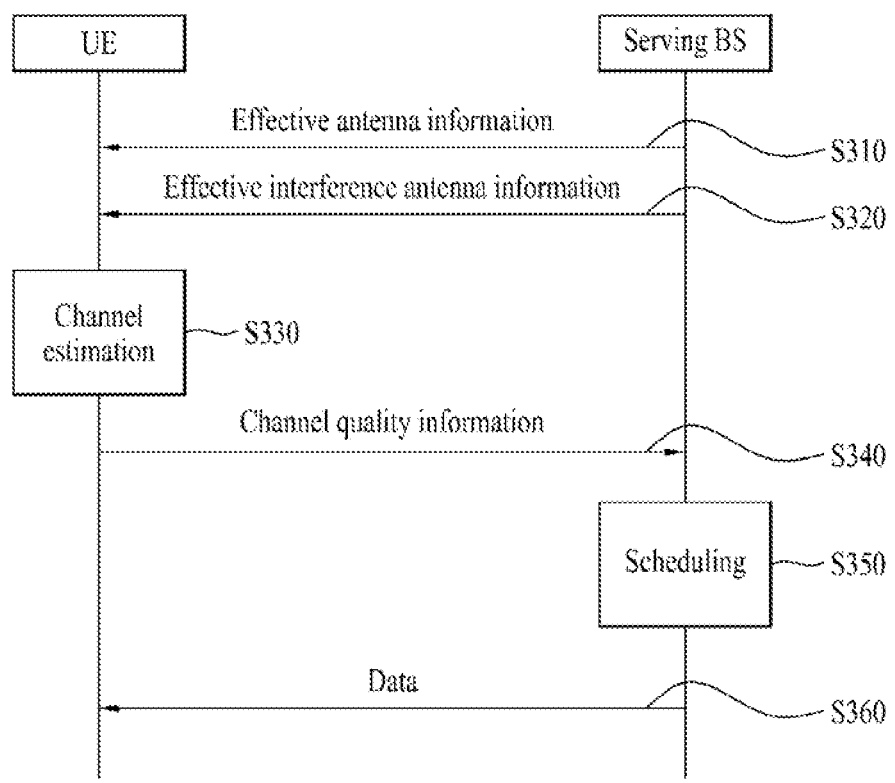
FIG. 8 to FIG. 11 are diagrams illustrating embodiments of a method for reducing inter-cell interference in a multi-cell DAS.

Referring to FIG. 8, the base station of the serving cell (hereinafter, referred to as serving base station) may transmit effective antenna information, which is information on actual antennas used for communication with a specific user equipment within coverage, to the specific user equipment (S310). The effective antenna information may be calculated by the base station on the basis of an uplink signal from the specific user equipment as described with reference to FIG. 6 and FIG. 7, or may be generated on the basis of estimated effective antenna information fed back from the specific user equipment.

Also, the serving base station may transmit effective interference antenna information, which is information on antenna(s) interfering with the specific user equipment, among antennas within a neighboring cell, to the specific user equipment (S320). The effective interference antenna information may include information on the number of the aforementioned effective interference antennas, effective interference antenna index information, and RS pattern information of the neighboring cell. The serving base station may share the effective interference antenna information with a neighboring base station through a backhaul link. In determining the effective interference antenna(s), the neighboring base station may use the method described with reference to FIG. 6 and FIG. 7. For example, as illustrated in FIG. 6, the neighboring base station may determine the effective interference antenna(s) on the basis of the uplink signal from the specific user equipment located at the cell edge. Alternatively, as illustrated in FIG. 7, the specific user equipment may estimate the effective interference antenna(s) on the basis of the downlink signal from the distributed antenna(s) of the neighboring cell and feed the effective interference antenna information back to the neighboring base station.

The user equipment, which has received the effective interference antenna information, may measure interference from the neighboring cell on the basis of the effective interference antenna information (S330), and may feed channel quality information back to the serving cell (S340). The channel quality information may include information indicating the channel status, such as PMI, channel matrix, covariance matrix, channel direction information, RI, and CQI. In the aforementioned description of the effective interference antenna, although the codebook based PMI of the channel quality information is selected using the effective interference antenna information, the effective interference antenna information of the present invention may be used to generate other information such as channel matrix, covariance matrix, channel direction information, RI and CQI in addition to the PMI. Meanwhile, the user equipment may feed PMI (worst companion) causing the strongest interference for itself or PMI (best companion) causing the weakest interference for itself back to the serving cell on the basis of the effective interference antenna information. Also, the user equipment may feed delta-CQI information, which indicates CQI variance when the corresponding PMI is selected and used by the neighboring cell, back to the serving cell together with the PMI.

The base station may perform scheduling allocating a radio resource to the user equipment, on the basis of the channel quality information (S350). In other words, the base station may allocate data of the user equipment to a certain frequency-time area. The base station transmits the data of the user equipment to the user equipment in the certain frequency-time area (S360).

For reference, the base station may select a precoding matrix, which will be used for precoding of data, on the basis of the channel quality information, and may determine MCS level which will be used for the data to be transmitted. The base station selects the MCS level on the basis of CQI information and performs coding and modulation for the transmission data in accordance with the selected MCS level. Also, the precoding matrix is set at the precoder 304 on the basis of the transmitted PMI/RI, and the data to be transmitted are precoded using the set precoding matrix. The precoded data are transmitted to the user equipment.

Referring to FIG. 8, the serving base station processor 400b may generate effective antenna information, which is information on an actual antenna used for communication with the specific user equipment within coverage of the serving cell, and may transmit the effective antenna information to the specific user equipment by controlling the transmitter 100b.

Also, the base station processor 100b may generate effective interference antenna information, which is information on antenna(s) interfering with the specific user equipment among antennas within the neighboring cell, and may transmit the effective interference antenna information to the specific user equipment by controlling the transmitter 100b. The serving base station processor 100b may share the effective interference antenna information with the neighboring base station through a backhaul link.

The user equipment receiver 300a, which has received the effective interference antenna information, transfers the effective interference antenna information to the user equipment processor 400a. The user equipment processor 400a may measure interference from the neighboring cell on the basis of the effective interference antenna information, and may generate channel quality information on the basis of the measured interference. The user equipment processor 400a may feed the channel quality information back to the serving cell (S340) by controlling the user equipment transmitter 100a. The channel quality information may include information indicating the channel status, such as PMI, channel matrix, covariance matrix, channel direction information, RI, and CQI. In the aforementioned description of the effective interference antenna, although the codebook based PMI of the channel quality information is selected using the effective interference antenna information, the effective interference antenna information of the present invention may be used to generate other information such as channel matrix, covariance matrix, channel direction information, RI and CQI in addition to the PMI. Meanwhile, the user equipment processor 400a may generate PMI (worst companion) causing the strongest interference for itself or PMI (best companion) causing the weakest interference for itself on the basis of the effective interference antenna information, and may control the user equipment transmitter 100a to feed the worst companion or best companion information back to the serving cell. Also, the user equipment processor 400a may generate delta-CQI information, which indicates CQI variance when the corresponding PMI is selected and used by the neighboring cell, and may control the user equipment transmitter 100a to feed the delta-CQI back to the serving cell.

The base station receiver 300b may receive the channel quality information and transfer the received channel quality information to the base station processor 400b, and the base station processor 400b may perform scheduling allocating a radio resource to the user equipment, on the basis of the channel quality information. In other words, the user equipment processor 400b may control the resource element mapper 305 to allocate transmission data to a certain frequency-time area. The base station transmitter 100b transmits the data of the user equipment to the user equipment in the certain frequency-time area under the control of the base station processor 400b.

The base station processor 400b may select a precoding matrix, which will be used for precoding of data, on the basis of the channel quality information, and may determine MCS level which will be used for the data to be transmitted. The base station transmitter 100b selects the MCS level on the basis of CQI information and performs coding and modulation for the transmission data in accordance with the selected MCS level. Also, the base station processor 400b sets the precoding matrix at the precoder 304 on the basis of the transmitted PMI/RI, and the precoder 304 precodes the transmission data by using the set precoding matrix. The precoded data are transmitted to the user equipment through the effective antenna(s).

Embodiment 2 for Removing Inter-DAS Cell Interference

Figure 9:
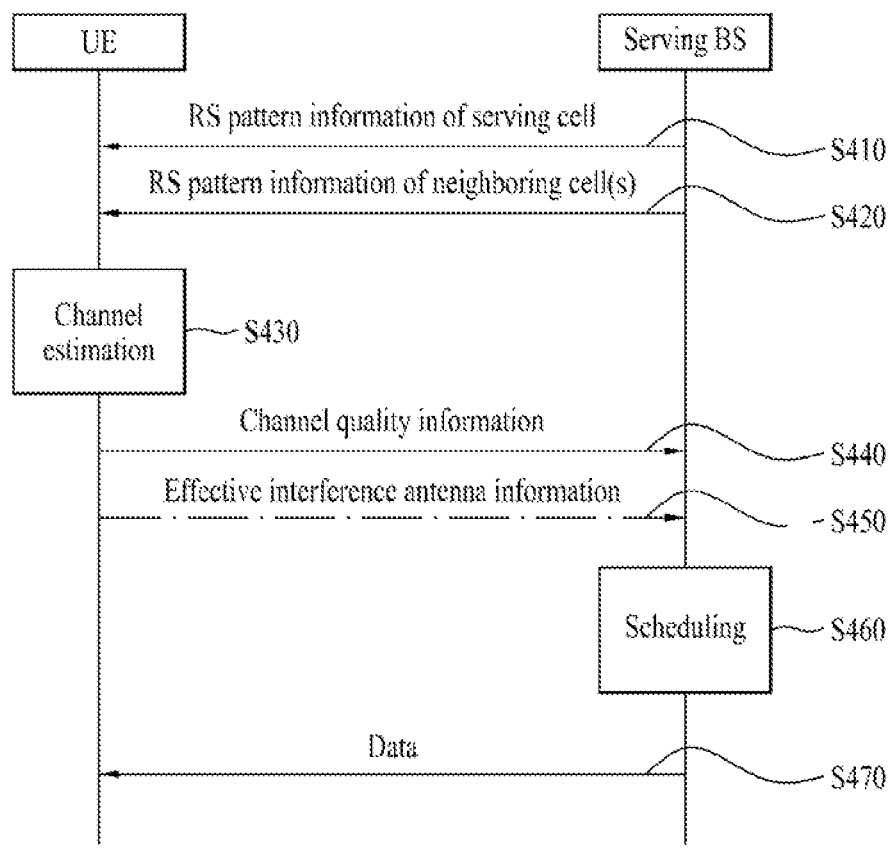

Referring to FIG. 9, the serving base station may transmit RS pattern information of the serving cell to the specific user equipment within corresponding coverage (S410). The serving base station may transmit RS pattern information of the serving cell to the user equipment together with information on the number of effective antennas and effective antenna index information. The information on the number of effective antennas and the effective antenna index information may be calculated by the base station on the basis of an uplink signal from the specific user equipment as described with reference to FIG. 6 and FIG. 7, or may be generated on the basis of estimated effective antenna information fed back from the specific user equipment.

Also, the serving base station may transmit RS pattern information of the neighboring cell to the specific user equipment (S420). The serving base station may share the RS pattern information with the neighboring base station through the backhaul link.

The user equipment, which has received the RS pattern information, may estimate effective antennas of distributed antennas of the serving cell, on the basis of the RS pattern of the serving cell. Also, if the RS pattern of the serving cell is previously defined implicitly in accordance with cell ID, the user equipment may know the RS pattern of the neighboring cell by reading out ID of the neighboring cell. Accordingly, the user equipment may estimate the number of effective interference antennas and corresponding antenna index(es) on the basis of the RS pattern of the neighboring cell, wherein the effective interference antenna(s) cause interference with the user equipment most frequently, among the distributed antennas of the neighboring cell. In estimating the number of the effective interference antennas and the corresponding antenna index(es), the user equipment may use a threshold value which is previously defined. In other words, antenna of which interference signal strength exceeds a predetermined level may be determined as the interference antenna.

The user equipment may estimate its channel status on the basis of the RS pattern of the serving cell, the RS pattern of the neighboring cell, and the effective interference antenna(s) of the neighboring cell (S430).

The user equipment may generate channel quality information on the basis of the estimated channel status and feed the generated channel quality information back to the serving cell (S440). The channel quality information may include information indicating the channel status, such as PMI, channel matrix, covariance matrix, channel direction information, RI, and CQI. As described above, the user equipment may feed delta-CQI information, which indicates CQI variance when the corresponding PMI is selected and used by the neighboring cell, back to the serving cell together with the PMI. Also, the user equipment may feed PMI (worst companion) causing the strongest interference for itself or PMI (best companion) causing the weakest interference for itself back to the serving cell on the basis of the effective interference antenna information.

Also, the user equipment may feed the number of estimated effective interference antennas and index(es) of the estimated effective interference antenna(s) back to the serving cell (S450). The user equipment may feed back the corresponding antenna index only to reduce the feedback amount by defining the number of effective interference antennas that may be selected previously by the user equipment to reduce interference.

The base station of the serving cell performs scheduling of data transmission for user equipments within corresponding coverage on the basis of the information fed back from the user equipment (S460). In other words, the base station allocates a predetermined frequency-time resource to each user equipment and transmits corresponding data in the allocated frequency-time area (S470).

As described above, the base station may determine a precoding matrix and MCS level on the basis of the channel quality information, and may perform coding and modulation and precoding for the transmission data in accordance with the determined precoding matrix and MCS level.

The serving base station processor 400b may control the transmitter 100b to transmit the RS pattern information of the serving cell to the specific user equipment within corresponding coverage. The base station processor 400b may control the transmitter 100b to transmit information on the number of effective antennas and effective antenna index information together with the RS pattern information of the serving cell.

Also, the base station transmitter 100b may transmit the RS pattern information of the neighboring cell to the specific user equipment under the control of the base station processor 400b.

The user equipment receiver 300a, which has received the RS pattern information, may estimate effective antennas of distributed antennas of the serving cell, on the basis of the RS pattern of the serving cell. Also, if the RS pattern of the serving cell is previously defined implicitly in accordance with cell ID, the user equipment processor 400a may know the RS pattern of the neighboring cell by reading out ID of the neighboring cell. Accordingly, the user equipment processor 400a may estimate the number of effective interference antennas and corresponding antenna index(es) on the basis of the RS pattern of the neighboring cell, wherein the effective interference antenna(s) cause(s) interference with the user equipment most frequently among the distributed antennas of the neighboring cell. In estimating the number of effective interference antennas and the corresponding antenna index (es), the user equipment processor 400a may use a threshold value which is previously defined. In other words, antenna of which interference signal strength exceeds a predetermined level may be determined as the interference antenna.

The user equipment processor 400a may estimate a channel status of the user equipment on the basis of the RS pattern of the serving cell, the RS pattern of the neighboring cell, and the effective interference antenna(s) of the neighboring cell, and may generate channel quality information on the basis of the estimated channel status. The user equipment transmitter 100a may feed the generated channel quality information back to the serving cell under the control of the user equipment processor 400a. In feeding back PMI, the user equipment processor 400a may select PMI (worst companion) causing the strongest interference for itself or PMI (best companion) causing the weakest interference for itself on the basis of the effective interference antenna information and control the user equipment transmitter 100a to feed the selected worst companion or best companion back to the serving cell.

Also, the user equipment processor 400a may generate information on the number of estimated effective interference antennas and index(es) of estimated effective interference antenna(s) and control the transmitter 100a to feed the generated information back to the serving cell. The user equipment processor 400a may control the user equipment transmitter 100a to feed back the corresponding antenna index(es) only to reduce the feedback amount by defining the number of effective interference antennas that may be selected previously by the user equipment to reduce interference.

The base station processor 400b of the serving cell performs scheduling of data transmission for user equipments within corresponding coverage on basis of the information fed back from the user equipment. The base station resource element mapper 305 may allocate a predetermined frequency-time resource to each user equipment under the control of the base station processor 400b.

As described above, the base station processor 400b may determine a precoding matrix and MCS level on the basis of the channel quality information, and may control the base station transmitter 100b to perform coding and modulation and precoding for the transmission data in accordance with the determined precoding matrix and MCS level.

Embodiment 3 for Removing Inter-DAS Cell Interference

Figure 10:
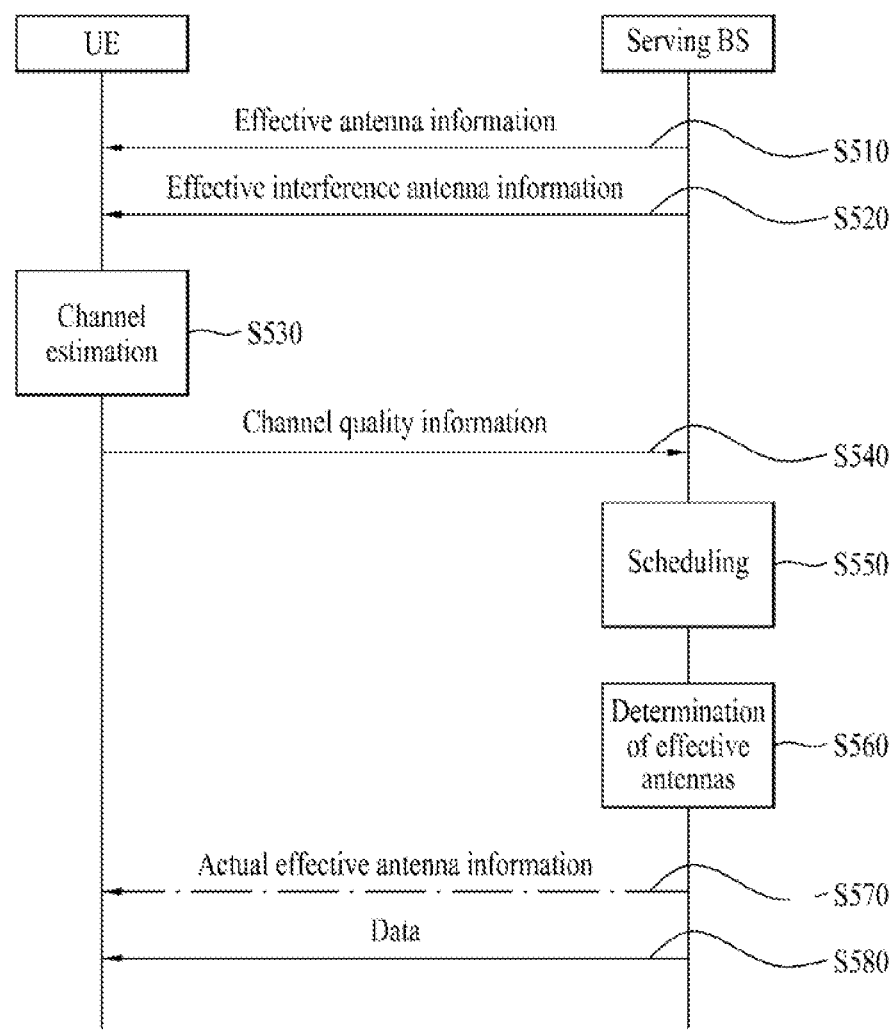

Referring to FIG. 10, the serving base station may transmit effective antenna information, which is information on actual antennas used for communication with a specific user equipment within coverage, to the specific user equipment (S510). The effective antenna information may be calculated by the base station on the basis of an uplink signal from the specific user equipment as described with reference to FIG. 6 and FIG. 7, or may be generated on the basis of estimated effective antenna information fed back from the specific user equipment.

Also, the serving base station may transmit effective interference antenna information, which is information on antenna(s) interfering with the specific user equipment, among antennas within a neighboring cell, to the specific user equipment (S520). The effective interference antenna information may include information on the number of the aforementioned effective interference antennas, effective interference antenna index information, and RS pattern information of the neighboring cell. The serving base station may share the effective interference antenna information with a neighboring base station through a backhaul link. In determining the effective interference antenna(s), the neighboring base station may use the method described with reference to FIG. 6 and FIG. 7, as described above.

The user equipment, which has received the effective interference antenna information, may measure interference from the neighboring cell on the basis of the effective interference antenna information (S530), and may feed channel quality information back to the serving cell (S540). The channel quality information may include information indicating the channel status, such as PMI, channel matrix, covariance matrix, channel direction information, RI, and CQI. As described above, the user equipment may feed PMI (worst companion) causing the strongest interference for itself or PMI (best companion) causing the weakest interference for itself back to the serving cell on the basis of the effective interference antenna information.

The base station may perform scheduling allocating a radio resource to the user equipment, on the basis of the channel quality information (S550). In other words, the base station may allocate data of the user equipment to a certain frequency-time area. Also, the base station may (again) determine the effective antenna(s) which will be used for actual data transmission, on the basis of the feedback channel quality information (S560).

The base station may transmit information on the actual effective antenna(s) used for the above transmission, to the user equipment (S570), and may transmit the transmission data to the user equipment in the certain frequency-time area through the actual effective antenna(s) (S580).

As described above, the base station may determine a precoding matrix and MCS level on the basis of the channel quality information, perform coding and modulation and precoding for the transmission data, and transmit the preceded transmission data to the user equipment through the actual effective antenna(s).

The serving base station processor 400b may generate effective antenna information, which is information on actual antenna(s) used for communication with a specific user equipment within coverage, and may transmit the effective antenna information to the specific user equipment by controlling the transmitter 100b.

Also, the base station processor 400b may generate effective interference antenna information, which is information on antenna(s) interfering with the specific user equipment among the antennas within the neighboring cell, and may transmit the effective interference antenna information to the specific user equipment by controlling the transmitter 100b. The base station processor 400b may generate the effective interference antenna information to include at least one of information on the number of the aforementioned effective interference antennas, the effective interference antenna index information, RS pattern information of the neighboring cell. The base station processor 100b may share the effective interference antenna information with the neighboring base station through a backhaul link.

The user equipment processor 400a, which has received the effective interference antenna information, may measure interference from the neighboring cell on the basis of the effective interference antenna information, and may generate channel quality information on the basis of the measured interference. The user equipment transmitter 100a may feed the channel quality information back to the serving cell under the control of the user equipment processor 400a. The channel quality information may include information indicating the channel status, such as PMI, channel matrix, covariance matrix, channel direction information, RI, and CQI. In feeding back the PMI, the user equipment processor 400a may generate PMI (worst companion) causing the strongest interference for itself or PMI (best companion) causing the weakest interference for itself on the basis of the effective interference antenna information, and may feed the worst companion or best companion information back to the serving cell by controlling the user equipment transmitter 100a, as described above.

The base station processor 400b may perform scheduling allocating a radio resource to the user equipment, on the basis of the channel quality information. The resource element mapper 305 of the base station may allocate transmission data, which will be transmitted to the user equipment, to a certain frequency-time area. Also, the base station processor 400b may (again) determine the effective antenna(s), which will be used for actual data transmission, on the basis of the effective interference antenna information and the feedback channel quality information.

The base station processor 400b may control the base station transmitter 100b to transmit information on the actual effective antenna(s) used for the above transmission, to the user equipment, and may control the base station transmitter 100b to transmit the transmission data to the user equipment in the certain frequency-time area through the actual effective antenna(s).

As described above, the base station processor 400b may determine a precoding matrix and MCS level on the basis of the channel quality information, perform coding and modulation and precoding for the transmission data, and transmit the preceded transmission data to the user equipment through the actual effective antenna(s).

Embodiment 4 for Removing Inter-Das Cell Interference

Figure 11:
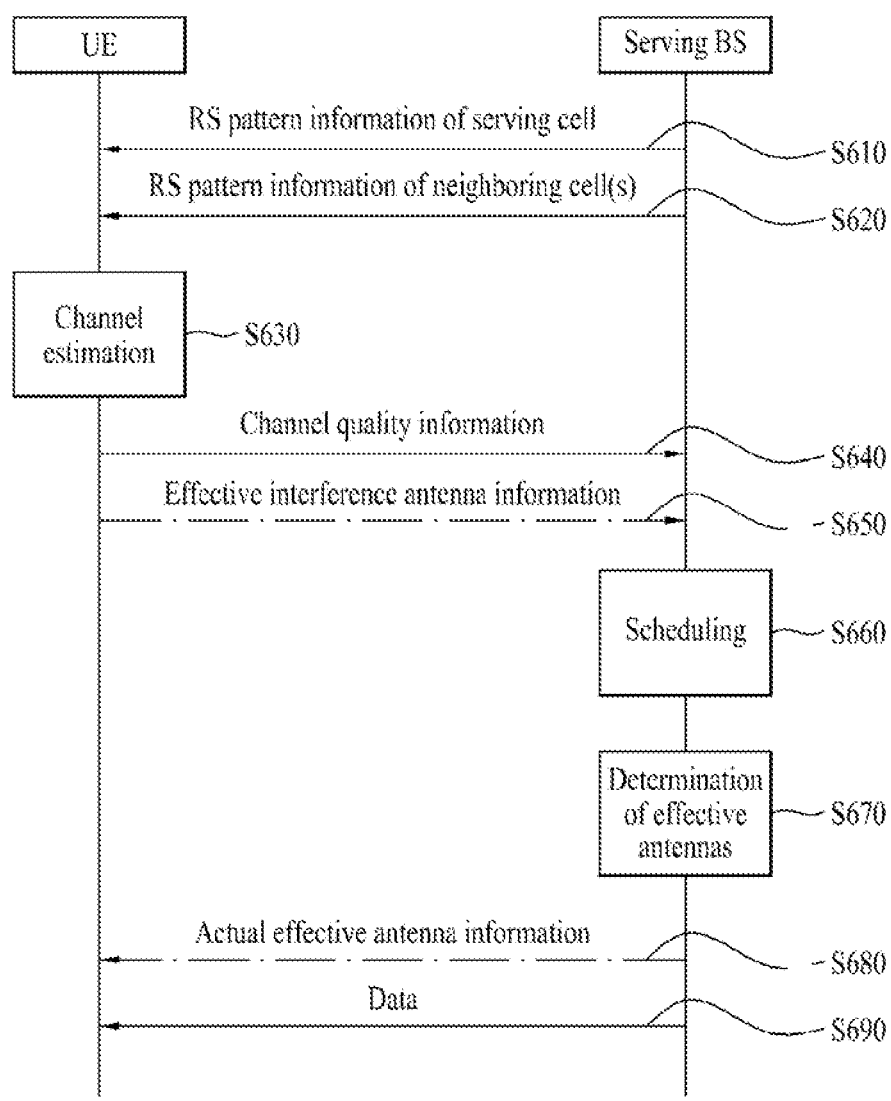

Referring to FIG. 11, the serving base station may transmit RS pattern information of the serving cell to a specific user equipment within corresponding coverage (S610). The serving base station may transmit the RS pattern information of the serving cell to the user equipment together with information on the number of effective antennas and effective antenna index information. The information on the number of effective antennas and the effective antenna index information may be calculated by the base station on the basis of an uplink signal from the specific user equipment as described with reference to FIG. 6 and FIG. 7, or may be generated on the basis of estimated effective antenna information fed back from the specific user equipment.

Also, the serving base station may transmit RS pattern information of the neighboring cell to the specific user equipment (S620). The neighboring base station may share the RS pattern information with the neighboring base station through the backhaul link.

The user equipment, which has received the RS pattern information, may estimate effective antennas of distributed antennas of the serving cell, on the basis of the RS pattern of the serving cell. Also, if the RS pattern of the neighboring cell is previously defined implicitly in accordance with cell ID, the user equipment may know the RS pattern of the neighboring cell by reading out ID of the neighboring cell. Accordingly, the user equipment may estimate the number of effective interference antennas and corresponding antenna index on the basis of the RS pattern of the neighboring cell, wherein the effective interference antenna(s) cause(s) interference with the user equipment most frequently among the distributed antennas of the neighboring cell. In estimating the number of the effective interference antennas and the corresponding antenna index(es), the user equipment may use a threshold value which is previously defined. In other words, antenna of which interference signal strength exceeds a predetermined level may be determined as the interference antenna.

The user equipment may estimate its channel status on the basis of the RS pattern of the serving cell, the RS pattern of the neighboring cell, and the effective interference antenna of the neighboring cell (S630).

The user equipment may generate channel quality information on the basis of the estimated channel status and feed the generated channel quality information back to the serving cell (S640).

Also, the user equipment may feed the number of estimated effective interference antennas and index(es) of the estimated effective interference antenna(s) back to the serving cell (S650). The user equipment may feed back the corresponding antenna index only to reduce the feedback amount by defining the number of effective interference antennas that may be selected previously by the user equipment to reduce interference.

The base station of the serving cell performs scheduling of data transmission for user equipments within corresponding coverage on the basis of the information fed back from the user equipment (S660). In other words, the base station may allocate a predetermined frequency-time resource to each user equipment.

The base station may (again) determine the effective antenna(s) which will be used for actual data transmission, on the basis of the effective interference antenna information and the feedback channel quality information (S670).

The base station may transmit information on the actual effective antenna(s) used for the above transmission, to the user equipment (S680), and may transmit the transmission data to the user equipment in the certain frequency-time area through the actual effective antenna(s) (S690).

As described above, the base station may determine a precoding matrix and MCS level on the basis of the channel quality information, and may perform coding and modulation and precoding for the transmission data.

The serving base station processor 400b may control the base station transmitter 100b to transmit the RS pattern information of the serving cell to the specific user equipment within corresponding coverage. The base station processor 400b may control the base station transmitter 100b to transmit the information on the number of effective antennas and the effective antenna index information together with the RS pattern information of the serving cell.

Also, the base station processor 400b may control the base station transmitter 100b to transmit the RS pattern information of the neighboring cell to the specific user equipment.

The user equipment processor 400a, which has received the RS pattern information, may estimate effective antenna(s) of distributed antennas of the serving cell, on the basis of the RS pattern of the serving cell. Also, if the RS pattern of the neighboring cell is previously defined implicitly in accordance with cell ID, the user equipment processor 400a may know the RS pattern of the neighboring cell by reading out ID of the neighboring cell. Accordingly, the user equipment processor 400a may estimate the number of effective interference antennas and corresponding antenna index(es) on the basis of the RS pattern of the neighboring cell, wherein the effective interference antenna(s) cause(s) interference with the user equipment most frequently among the distributed antennas of the neighboring cell. In estimating the number of the effective interference antennas and the corresponding antenna index(es), the user equipment processor 400a may use a threshold value which is previously defined. In other words, antenna of which interference signal strength exceeds a predetermined level may be determined as the interference antenna.

The user equipment processor 400a may estimate a channel status of the user equipment on the basis of the RS pattern of the serving cell, the RS pattern of the neighboring cell, and the effective interference antenna of the neighboring cell, and may generate channel quality information on the basis of the estimated channel status and provide the generated channel quality information to the user equipment transmitter 100a. The user equipment transmitter 100a may feed the generated channel quality information back to the serving cell under the control of the user equipment processor 400a.

Also, the user equipment processor 400a may control the user equipment transmitter 100a to feed the information on the number of estimated effective interference antennas and index(es) of the estimated effective interference antenna(s) back to the serving cell. The user equipment processor 400a may control the user equipment transmitter 100a to feed back the corresponding antenna index(es) only to reduce the feedback amount by defining the number of effective interference antennas that may be selected previously by the user equipment to reduce interference.

The base station processor 400b of the serving cell performs scheduling of data transmission for user equipments within corresponding coverage on the basis of the information fed back from the user equipment.

The base station processor 400b may (again) determine the effective antenna(s) which will be used for actual data transmission, on the basis of the effective interference antenna information and the feedback channel quality information. The base station processor 400b may control the base station transmitter 100b to transmit information on the actual effective antenna(s) used for the above transmission, to the user equipment, and may control the base station transmitter 100b to transmit the transmission data to the user equipment in the certain frequency-time area through the actual effective antenna(s).

As described above, the base station processor 400b may determine a precoding matrix and MCS level on the basis of the channel quality information, and may perform coding and modulation and precoding for the transmission data.

It has been described that the serving cell provides the effective antenna information of the serving cell to the user equipment in FIG. 8 to FIG. 11. However, instead of transmitting the effective antenna information generated by the base station of the serving cell to the user equipment, the user equipment may determine the effective antenna(s) for the user equipment on the basis of the downlink signal of the serving cell as described in FIG. 7. In other words, a hybrid method of the method for determining an effective antenna in a serving cell as described in FIG. 6 and FIG. 7 and the method for determining effective antenna(s) in a neighboring cell as described in FIG. 8 to FIG. 11 may be used for channel quality estimation or calculation at the user equipment or the base station. The base station processor 400a and the user equipment processor 400a may be configured to generate the uplink and downlink signal and/or the effective antenna information, and the effective interference antenna information described in FIG. 6 to FIG. 11, and may be configured to control the corresponding transmitters 100a and 100b to transmit the generated uplink and downlink signal and/or the effective antenna information and the effective interference antenna information to the user equipment or the base station of the corresponding cell.

Hereinafter, the example to which the embodiments of the present invention are applied in the case that the DAS follows the existing system will be described with reference to FIG. 12 to FIG. 15.

Figure 12:
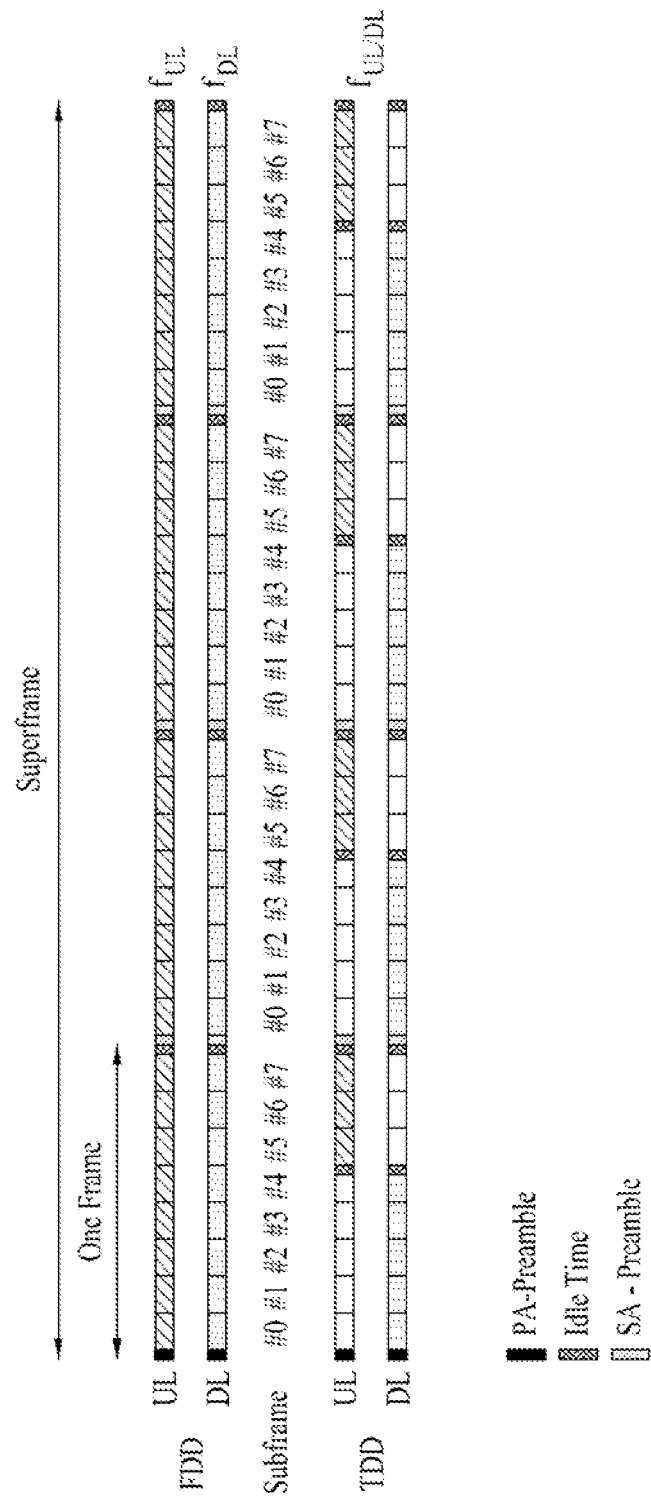
FIG. 12 and FIG. 13 are diagrams illustrating a structure of a frame used for signal transmission and reception in a wireless communication system.
Figure 13:
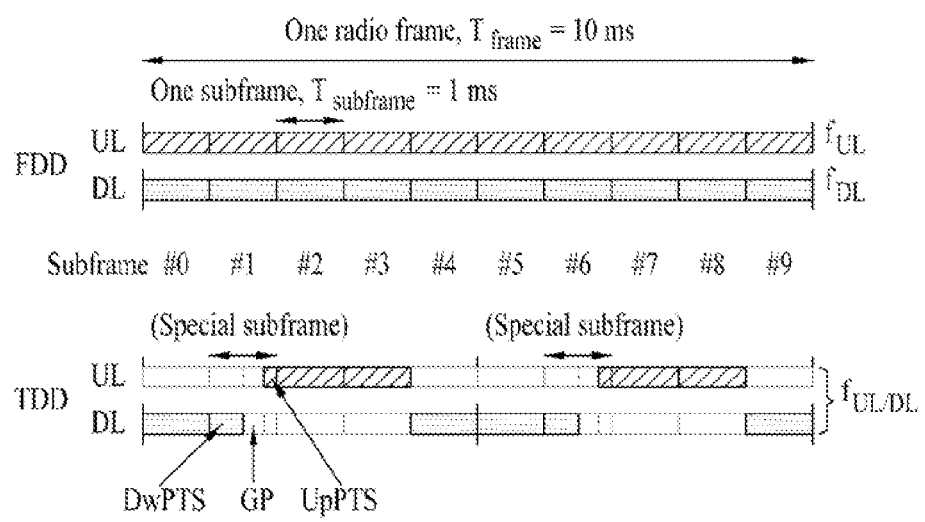

FIG. 12 and FIG. 13 are diagrams illustrating a structure of a frame used for signal transmission and reception in a wireless communication system. FIG. 12 illustrates an example of a radio frame used in the IEEE 802.16m system, and FIG. 13 illustrates an example of a radio frame used in the 3GPP LTE system.

Referring to FIG. 12, the effective interference antenna information of the present invention may be transmitted to the user equipment or the base station by using the radio frame of the IEEE 802.16m system. The radio frame structure in the IEEE 802.16m system includes superframes SU0 to SU3 of 20 ms that support 5 MHz, 8.75 MHz, 10 MHz, or 20 MHz. Each of the superframes includes four frames F0 to F3 of 5 ms having the same size, and starts with a super frame header (SFH). The super frame header may be located within the first subframe as shown in FIG. 12, and carries essential system parameters and system configuration information. In more detail, the super frame header may be classified into a Primary SFH (P-SFH) and a Secondary SFH (S-SFH). The P-SFH may be transmitted per superframe, and the S-SFH may be transmitted per superframe. The super frame header may include a broadcast channel on which normal broadcast information or advanced broadcast information (ABI) is transmitted.

The frame includes eight subframes SF0 to SF7. The subframes are allocated for downlink or uplink transmission. Each subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in one subframe may be 5 to 7 depending on channel bandwidth and cyclic prefix (CP) length. A type of the subframe may be defined depending on the number of OFDM symbols included in the subframe. For example, the type of the subframe may be defined in such a manner that subframe type-1 includes six OFDM symbols, subframe type-2 includes seven OFDM symbols, subframe type-3 includes five OFDM symbols, and subframe type-4 includes nine OFDM symbols. One frame may include the same type subframes or different types of subframes.

The OFDM symbol includes a plurality of subcarriers, and the number of subcarriers is determined depending on a size of fast fourier transform (FFT).

The aforementioned structure is only exemplary. Accordingly, various modifications may be made in the length of the superframe, the number of frames included in the superframe, the number of subframes included in the frame, the number of OFDMA symbols included in the subframe, and parameters of OFDMA symbols. For example, the number of subframes included in the frame may be varied depending on the channel bandwidth and the CP length.

In the meantime, the radio frames used in the IEEE 802.16m system may be divided for a frequency division duplex (FDD) mode, a half frequency division duplex (H-FDD) mode, and a time division duplex (TDD) mode depending on a frequency and time division mode. Downlink transmission and uplink transmission are differentiated by frequency in the FDD mode. In other words, different frequencies $f_{DL}$ and $f_{UL}$ are respectively used for downlink transmission and uplink transmission. In case of the FDD mode, an idle time may exist at the end of each frame. On the other hand, downlink transmission and uplink transmission are performed by the same frequency $F_{UL/DL}$ and differentiated by time in the TDD mode. Accordingly, subframes within one frame are divided into a downlink subframe and an uplink subframe in the TDD mode. Idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

In the IEEE 802.16m system, a downlink synchronization channel includes a primary synchronization channel and a secondary synchronization channel, wherein the primary synchronization channel includes a primary advanced preamble (PA-preamble) and the secondary synchronization channel includes a secondary advanced preamble (SA-preamble). The PA-preamble is transmitted through the first OFDM symbol of each frame, and is used to acquire time/frequency synchronization, segment cell identifier, information such as system information, and a channel bandwidth used in the system. The SA-preamble is used to acquire a final physical cell identifier such as cell ID or segment identifier, and may further be used for measurement of received signal strength indication (RSSI). The aforementioned superframe structure used in the system based on the CAS may be applied to the embodiments of the present invention. Accordingly, the base station according to one embodiment of the present invention may transmit information related to RS pattern of the serving cell through the PA-preamble or the SA-preamble.

In the meantime, the base station according to one embodiment of the present invention performs scheduling for each distributed antenna group that includes one or more distributed antennas included within a specific service region, and various methods for scheduling each distributed antenna group depending on signaling information shared among the distributed antennas may be configured. For example, in the IEEE 802.16m system, the base station signals broadcast information, which includes preamble, midamble, cell common system parameter or system configuration information, through the SFH before performing communication with the user equipment. The midamble is a synchronization pattern inserted between data symbols to improve channel estimation performance, and is broadcasted to reinforce channel estimation performance when long symbol is transmitted to each antenna during communication. The midamble may be inserted into the data symbol periodically or non-periodically.

The base station according to one embodiment of the present invention may transmit effective antenna information of the corresponding cell for the corresponding user equipment and/or effective interference antenna information of the neighboring cell to the user equipment in the form of broadcast information. The effective antenna information may include the number and/or index of antennas, and the effective interference antenna information may include the number and/or index of effective antennas, and RS pattern information of the neighboring cell.

A method for configuring preamble, midamble, ranging and permutation in accordance with BS ID per base station and signaling broadcast information may be determined If the DAS according to one embodiment of the present invention is used, the base station may perform scheduling to equally configure broadcast information broadcasted from a plurality of distributed antennas or signal different kinds of broadcast information per distributed antenna group.

One user equipment may determine a plurality of distributed antenna groups as a plurality of base stations and perform handover based on movement of the user equipment. However, since the base station within a specific cell performs scheduling for distributed antennas within a specific cell, communication throughput may be improved through scheduling for cooperation or interference avoidance among the distributed antenna groups.

In the meantime, the base station may transmit unicast information, which includes AMAP-IE, MAC message, and DL/UL data burst, for actual data transmission and reception, to the corresponding user equipment after performing an operation such as synchronization through broadcast information for communication with the user equipment.

Referring to FIG. 13, the radio frame of the LTE system includes ten subframes. The time required to transmit one subframe will be referred to as a transmission time interval (TTI). In the same manner as the IEEE 802.16m system, the radio frames may be divided for an FDD mode, an H-FDD mode, and a TDD mode depending on downlink and uplink data transmission. The subframe includes two consecutive slots. For example, one subframe may have a length of 1 ms, and one slot may have a length of 0.5 ms. Each slot may include seven OFDM symbols in case of a normal cyclic prefix (CP) in a corresponding cell, and may include six OFDM symbols in case of an extended CP in the corresponding cell.

In the frequency domain, resources may be grouped in a unit of 12 subcarriers. A group that includes 12 subcarriers in one slot may be referred to as a resource block (RB). The smallest unit of the resource is a resource element (RE) that includes one subcarrier and one symbol. One resource block includes 84 resource elements in case of the normal CP, and includes 72 resource elements in case of the extended CP.

For reference, maximum three OFDM symbols located at the front of the first slot within one downlink subframe correspond to a control region to which a physical downlink control channel (PDCCH) is allocated. The other OFDM symbols correspond to a data region to which a physical downlink shared channel (PDSCH) is allocated. In addition to the PDCCH, control channels such as a Physical Control Format Indicator Channel (PCFICH), a Physical Downlink Control Channel (PDCCH), and a Physical Hybrid ARQ Indicator Channel (PHICH) may be allocated to the control region. The user equipment may read out data information transmitted through the PDSCH by decoding control information transmitted through the PDCCH. In this case, the control region exemplarily includes three OFDM symbols, and the number of OFDM symbols included in the control region within the subframe may be identified through the PCFICH.

The PDSCH is a downlink channel carrying main data, and may be used for transmission of all the user data as well as a broadcast channel which is not transmitted on a physical broadcast channel (PBCH). The user data are transmitted on the PDSCH in a unit of transport block. Each transport block corresponds to MAC-layer protocol data unit. If the PDSCH is used for user data transmission, one or two transport blocks may be transmitted to each user equipment per subframe. A phase reference for demodulating the PDSCH may be provided by a reference signal (RS). Resource elements except for those reserved for control signaling, PBCH, synchronization signal and reference signal may be allocated to the PDSCH.

The aforementioned structure of the radio frame in the LTE system is only exemplary, and various modifications may be made in the number of subframes included in the radio frame, the number of slots included in the subframe, or the number of symbols included in the slot.

The effective antenna information within the serving cell according to the embodiments of the present invention may implicitly be transmitted to the user equipment through the PBCH. The PBCH is used for transmission of a master information block (MIB), which includes a downlink system bandwidth (DL BW), PHICH configuration, and a system frame number (SFN). Meanwhile, the user equipment may implicitly know the number of transmitting antennas of the base station by receiving the PBCH. The base station may implicitly signal the number of effective antennas to the user equipment by masking (for example, XOR operation) sequences corresponding to the number of antennas used for transmission, among distributed antennas of a corresponding cell to 16-bit CRC (cyclic redundancy check) used for error detection of the PBCH. In addition to the number of effective antennas, other effective antenna information, for example, the effective antenna index(es) may be configured by a system information block (SIB) and transmitted to the user equipment through the PUSCH. Also, the user equipment according to the embodiments of the present invention may transmit the aforementioned DAS channel quality information through the PUSCH and/or the PUCCH. The base station according to the embodiments of the present invention may transmit the effective interference antenna information configured by a system information block (SIB), through the PUSCH and/or the PUCCH.

The effective antenna information and/or the effective interference antenna information may be transmitted to the user equipment through higher layer signaling higher than the physical layer. The base station processor 400*b* according to the present invention may control the corresponding transmitter 100*b* to perform higher layer signaling at the time when the user equipment should perform coordinated multi-point (CoMP), or periodically.

Alternatively, the number of effective antennas and/or the effective interference antenna information may be transmitted to the user equipment through the PDCCH in accordance with L1/L2 control signaling. The base station transmits downlink control information (DCI) through the PDCCH. The base station selects a DCI format and includes downlink control information in accordance with the selected DCI format. The base station processor 400*b* may select the DCI format and configure the number of the aforementioned effective antennas and/or the effective interference antenna information as downlink control information of the selected DCI format. The base station transmitter 100*b* transmits the downlink control information to the user equipment(s) within coverage of the base station through modulation, layer mapping, and resource allocation under the control of the base station processor 400*b*.

The DCI includes uplink scheduling information, downlink scheduling information, system information, uplink transmission (Tx) power control command, control information for paging, and control information for indicating random access response (RACH response). Also, the DCI may include control information for indicating semi-persistent scheduling (SPS) activation. The DCI may include control information indicating semi-persistent scheduling deactivation. Semi-persistent scheduling may be used for uplink or downlink voice over Internet protocol (VoIP) transmission.

Examples of the DCI format include a format 0 for Physical Uplink Shared Channel (PUSCH) scheduling, a format 1 for scheduling of one Physical Downlink Shared channel (PDSCH) codeword, a format 1A for compact scheduling of one PDSCH codeword, a format 1B for scheduling for rank-1 transmission of a single codeword in a spatial multiplexing mode, a format 1C for very simple scheduling of a Downlink Shared Channel (DL-SCH), a format 1D for PDSCH scheduling in a multi-user spatial multiplexing mode, a format 2 for PDSCH scheduling a closed-loop spatial multiplexing mode, a format 2A for PDSCH scheduling in an open-loop spatial multiplexing mode, a format 2B for PDSCH scheduling in multilayer beamforming, and formats 3 and 3A for transmission of a transmission power control (TPC) command for an uplink channel.

The base station according to one embodiment of the present invention may transmit the effective antenna information and/or the effective interference antenna information to the user equipment by using some field of the existing DCI format or some of a DCI format newly defined for DAS. The effective antenna information is the information specifying an antenna used for communication with the corresponding user equipment, among a plurality of distributed antennas of the serving cell, and the effective interference antenna information is the information specifying antenna(s) interfering with the user equipment, among distributed antennas of the neighboring cell. The number of effective antennas and/or the effective antenna index(es) may be used as the effective antenna information, and the RS pattern information and/or the number of effective interference antennas, and the effective interference antenna index(es) may be used as the effective antenna interference information. If the user equipment may estimate the number of effective interference antennas and index(es) of effective interference antenna(s) from the downlink signal, the DCI may be configured to include the RS pattern information only of the neighboring cell.

Figure 14:
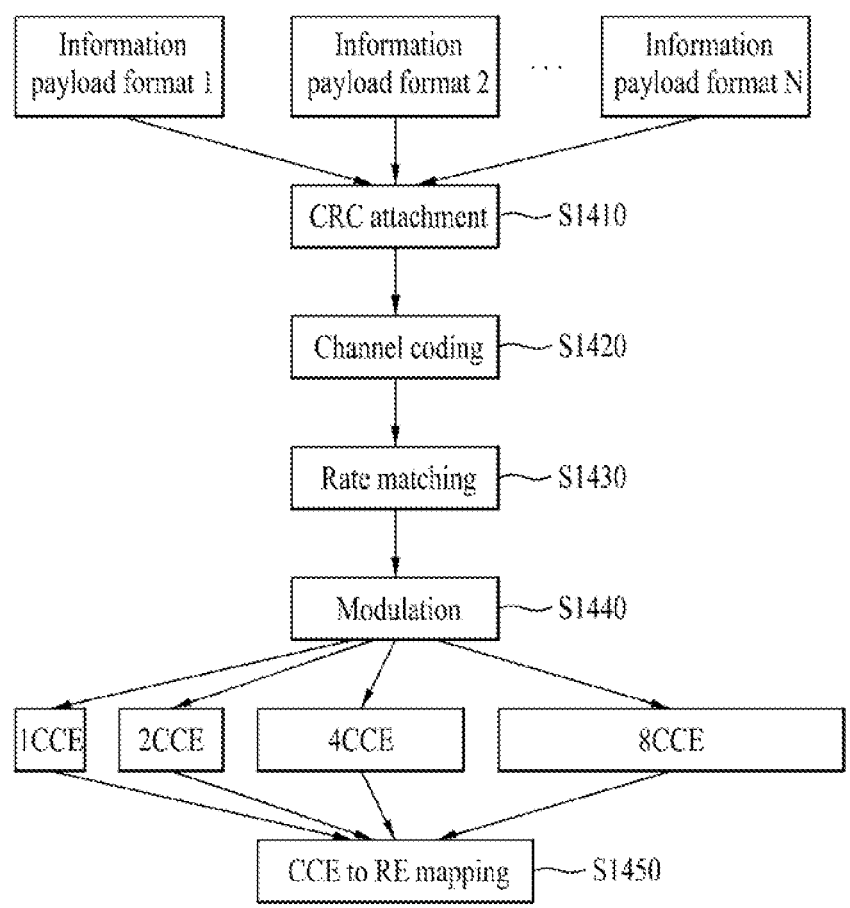
FIG. 14 is a flow chart illustrating configuration of a PDCCH.

FIG. 14 is a flow chart illustrating configuration of a PDCCH.

Referring to FIG. 14, the base station generates control information in accordance with the DCI format. The base station may generate control information in accordance with effective antenna information and/or effective interference antenna information transmitted to the user equipment and select one of a plurality of DCI formats (DCI format 1, 2, . . . , N). Cyclic redundancy check (CRC) for error detection is added to the control information generated in accordance with each DCI format (S1410). An identifier (for example, radio network temporary identifier (RNTI)) is masked with the CRC depending on owner or usage of the PDCCH. If the PDCCH is for a specific user equipment, a unique identifier (for example, cell-RNTI (C-RNTI)) of the corresponding user equipment may be masked with the CRC. In other words, the CRC may be scrambled with the unique identifier of the user equipment.

The base station generates coded data by channel coding the control information with the CRC (S1420), and performs rate matching for the coded data in accordance with a CCE aggregation level allocated to the PDCCH format (S1430). The base station modulates the coded data to generate modulated symbols (S1440), and maps the modulated symbols to physical resource elements (REs) (CCE to RE mapping) (S1450).

The base station processor 400*b* is configured to generate control information in accordance with the DCI format. The base station processor 400*b* may generate control information in accordance with effective antenna information and/or effective interference antenna information transmitted to the user equipment and select one of a plurality of DCI formats (DCI format 1, 2, . . . , N). Also, the base station processor 400*b* may add cyclic redundancy check (CRC) for error detection to the control information generated in accordance with each DCI format. The base station processor 400*b* may mask an identifier (for example, radio network temporary identifier (RNTI)) with the CRC depending on owner or usage of the PDCCH. Since the effective antennas and/or effective interference antennas according to the present invention are varied depending on the user equipments, for a PDCCH carrying the effective antenna information and/or the effective interference antenna information for a specific user equipment, the base station processor 400*b* of the present invention may mask a unique identifier (for example, cell-RNTI (C-RNTI)) of the specific user equipment with the CRC. In other words, the base station processor 400*b* may control the scrambler 301 of the base station to scramble the CRC together with the unique identifier of the user equipment.

The base station processor 400b generates coded data by channel coding the control information with the CRC, and performs rate matching for the coded data in accordance with a CCE aggregation level allocated to the PDCCH format. The modulation mapper 303 of the base station modulates the coded data to generate modulated symbols under the control of the base station processor 400b, and the resource element mapper 305 of the base station maps the modulated symbols to physical resource elements (REs) (CCE to RE mapping) under the control of the base station processor 400b. The transmitter 100b and the antenna 500b of the base station transmit the symbols to the corresponding user equipment(s) through the resource elements under the control of the base station.

The base station processor 400b may control the resource element mapper 305 to map a plurality of multiplexed PDCCHs for a plurality of user equipments to the control region of one subframe. The transmitter 100b and the antenna 500b may transmit the subframe to the plurality of user equipments under the control of the base station processor 400b.

Figure 15:
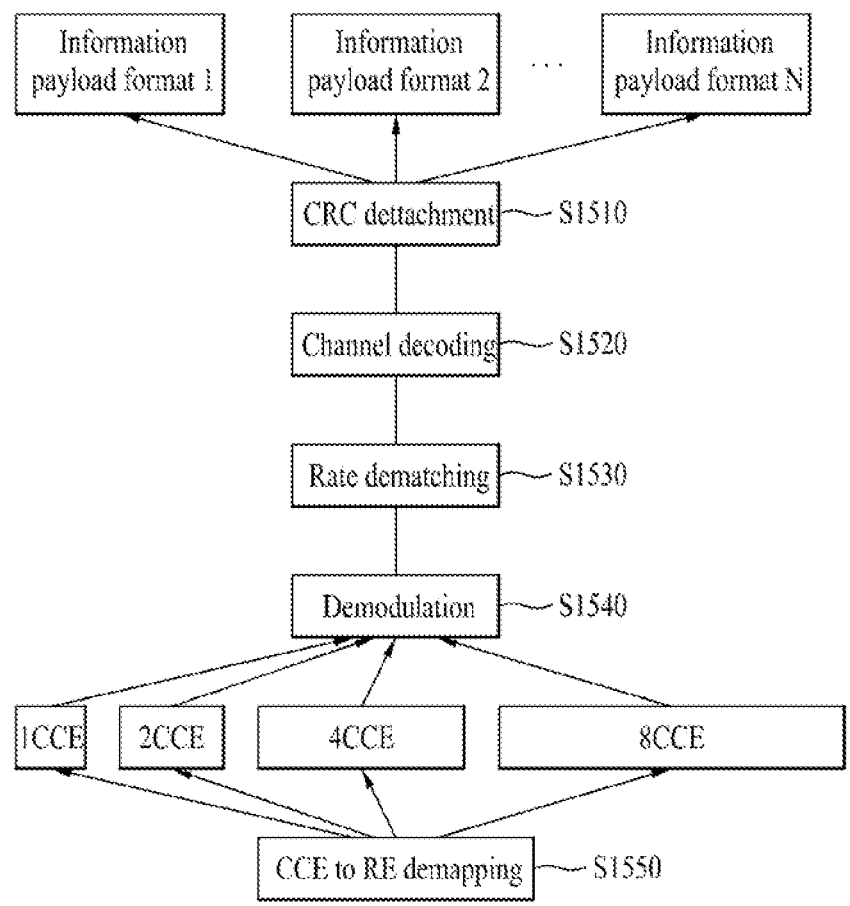
FIG. 15 is a flow chart illustrating PDCCH processing.

FIG. 15 is a flow chart illustrating PDCCH processing.

Referring to FIG. 15, the user equipment performs demapping of physical resource elements transmitted from the base staion into CCEs (CCE to RE mapping) (S1510). Since the user equipment does not know what CCE aggregation level should be used to receive the PDCCH, it performs demodulation for each CCE aggregation level (S1520). The user equipment performs rate dematching for the demodulated data (S1530). Since the user equipment does not know what DCI format of control information should be received therein, it performs rate dematching for each DCI format. The user equipment performs channel decoding for the rate dematched data in accordance with a code rate, and detects whether an error has occurred, by checking CRC. If an error has not occurred, the user equipment determines that its PDCCH has been detected. If the error has occurred, the user equipment continues to perform blind decoding for the other CCE aggregation level or the other DCI format (S1540). The user equipment that has detected its PDCCH removes the CRC from the decoded data and acquires control information required for the user equipment, for example, the effective antenna information and/or the effective interference antenna information according to the embodiments of the present invention (S1550).

The plurality of multiplexed PDCCHs for the plurality of users may be transmitted within the control region of one subframe. The user equipment monitors the PDCCHs. In this case, monitoring means that the user equipment attempts decoding for each of the PDCCHs in accordance with the DCI format. The base station may not provide the user equipment with information on where the corresponding PDCCH is located within the control region allocated within the subframe. In this case, the user equipment searches for its PDCCH by monitoring a set of PDCCH candidates within the subframe. This will be referred to as blind decoding. The user equipment simultaneously performs identification of the PDCCH transmitted thereto and decoding of the control information transmitted through the corresponding PDCCH through the blind decoding. For example, if the corresponding PDCCH is demasked with the C-RNTI and no CRC error is detected, the user equipment detects its PDCCH.

The user equipment that has detected its PDCCH may identify the corresponding effective antenna(s) and/or effective interference antenna(s) on the basis of the effective antenna information and/or the effective interference antenna information transmitted through the PDCCH. The user equipment may generate channel quality information, which will be fed back to the base station, by using the corresponding effective antenna and/or the effective interference antenna. For example, the user equipment may feed CQI, RI, best/worst companion PMI back to the base station.

For reference, in order to effectively reduce overhead of blind decoding, the limited number of DCI formats transmitted through the PDCCH is defined. The number of DCI formats is smaller than different kinds of control information transmitted using the PDCCH. The DCI format includes a plurality of different kinds of information fields. A type of the information fields constituting the DCI format, the number of the information fields, and bits of each information field are varied depending on the DCI format. Also, size of control information matched with the DCI format is varied depending on the DCI format. PDCCH information is performed for various kinds of the control information by using one of the limited number of DCI formats. In other words, a random DCI format may be used for information of two or more kinds of control information. Accordingly, when the control information is specified as a specific value of the information field of the DCI format, some of the plurality of information fields may not be required. In other words, a detailed value may not be defined in some of the plurality of information fields constituting the DCI format. Some information field constituting the DCI format may become a reserved field, whereby the corresponding information field may be reserved at a state having an arbitrary value. This is for size adaptation of a plurality of different kinds of control information in accordance with one DCI format.

The user equipment processor 400a controls the receiver 300a to perform demapping of physical resource elements transmitted from the base station into CCEs (CCE to RE mapping). Since the user equipment processor 400a does not know what CCE aggregation level should be used by the user equipment to receive the PDCCH, it controls the receiver 300a to perform demodulation for each CCE aggregation level. The user equipment receiver 300a performs rate dematching for the demodulated data under the control of the user equipment processor 400a. Since the user equipment processor 400a does not know what DCI format of control information should be received therein, it controls the receiver 300a to perform rate dematching for each DCI format. The user equipment processor 400a controls the receiver 300a to perform channel decoding for the rate dematched data in accordance with a code rate, and detects whether an error has occurred, by checking CRC. If an error has not occurred, the user equipment processor 400a determines that its PDCCH has been detected. If the error has occurred, the user equipment processor 400a controls the receiver 300a to continue to perform blind decoding for the other CCE aggregation level or the other DCI format. The user equipment processor 400a that has detected its PDCCH removes the CRC from the decoded data and acquires control information required for the user equipment, for example, the effective antenna information and/or the effective interference antenna information according to the embodiments of the present invention.

In the meantime, the processor 400a of the user equipment may control the receiver 300a to attempt decoding for each of the PDCCHs in accordance with the DCI format which is monitored. As described above, the base station may not provide the user equipment with information on where the corresponding PDCCH is located within the control region allocated within the subframe. In this case, the user equipment processor 400a searches for its PDCCH by monitoring a set of PDCCH candidates within the subframe.

The receiver 300a may simultaneously perform identification of the PDCCH transmitted thereto and decoding of the control information transmitted through the corresponding PDCCH under the control of the user equipment processor 400a. The user equipment processor 400a may perform demasking for the C-RNTI of the user equipment from the PDCCH, and may determine the PDCCH of the user equipment if no CRC error is detected. The user equipment processor 400a may determine the effective antenna(s) and/or the effective interference antenna(s) on the basis of the effective antenna information and/or the effective interference antenna information carried in the PDCCH having no error.

The user equipment processor 400a may estimate a channel status in accordance with the aforementioned effective antenna(s) and/or the effective interference antenna(s), and may generate feedback information such as RI, CQI, and PMI. In transmitting PMI to perform CoMP in the multi-cell DAS, the best/worst PMI may be selected. The user equipment processor 400a controls the transmitter 100a to transmit RI, CQI, and PMI.

In the meantime, for size adaptation of a plurality of different kinds of control information in accordance with one DCI format, the base station processor 400b according to the embodiments of the present invention may set an arbitrary value (for example, null value) to remaining bits after allocation of the effective antenna information and/or the effective interference antenna information from the corresponding format in configuring the DCI.

According to the embodiments of the present invention, the user equipment may efficiently measure interference of the neighboring cell through the effective interference antenna information and feed the measured interference back to the serving cell. The embodiments of the present invention may be used for DAS CoMP. Accordingly, the embodiments of the present invention may reduce interference of the user equipment at the DAS cell edge and efficiently improve entire throughput of the wireless system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be applied to the base station and/or the user equipment in the wireless communication system.

The invention claimed is:

1. A method for transmitting a signal by a base station of a certain cell, which includes a plurality of distributed antennas spaced apart from one another at least a predetermined distance, the method comprising the steps of:

transmitting, by the base station, first information to a user equipment within the certain cell, the first information informing the user equipment of a first antenna group having one or more antennas used for communication with the user equipment among the plurality of distributed antennas within the certain cell; and transmitting, by the base station, second information to the user equipment, the second information informing the user equipment of a second antenna group having one or more antennas interfering with the user equipment among a plurality of distributed antennas within a neighboring cell of the certain cell, wherein the second information includes information indicating a number of antennas belonging to the second antenna group.

2. The method according to claim 1, wherein the second information includes information on a reference signal pattern of the neighboring cell.

3. The method according to claim 1, wherein the second information further includes information an index for each of the one or more antennas belonging to the second antenna group.

4. The method according to claim 3 claim 1, wherein the first information includes information indicating a number of antennas belonging to the first antenna group and information indicating an index for each of the one or more antennas belonging to the first antenna group.

5. A base station of a certain cell, which includes a plurality of distributed antennas spaced apart from one another at least a predetermined distance, the base station comprising:

a transmitter configured to transmit a signal; and a processor configured to control the transmitter to transmit first information to a user equipment within the certain cell, the first information informing the user equipment of a first antenna group having one or more antennas used for communication with the user equipment among the plurality of distributed antennas within the certain cell and transmit second information to the user equipment, the second information informing the user equipment of a second antenna group having one or more antennas interfering with the user equipment among a plurality of distributed antennas within a neighboring cell of the certain cell, wherein the second information includes information indicating a number of antennas belonging to the second antenna group.

6. The base station according to claim 5, wherein the processor is configured to generate the second information, which includes information on a reference signal pattern of the neighboring cell, and provide the generated information to the transmitter.

7. The base station according to claim 5, wherein the processor is configured to generate the second information, which includes information indicating an index for each of the one or more antennas belonging to the second antenna group.

8. The base station according to claim 5, wherein the processor is configured to generate the first information, which includes information indicating a number of antennas belonging to the first antenna group and information indicating an index for each of the one or more antennas belonging to the first antenna group.

9. A method for receiving a signal in user equipment from a base station, which includes a plurality of distributed antennas spaced apart from one another at least a predetermined distance, the method comprising the steps of:

receiving, from the base station, first information informing the user equipment of a first antenna group having one or more antennas used for communication with the user equipment among the plurality of distributed antennas within the base station;

receiving, from the base station, second information informing the user equipment of a second antenna group having one or more antennas interfering with the user equipment among a plurality of distributed antennas within a neighboring base station of the base station; and generating channel quality information on the basis of the first information and the second information, wherein the second information includes information indicating a number of antennas belonging to the second antenna group.

10. The method according to claim 9, wherein the second information includes information on a reference signal pattern of the neighboring base station.

11. The method according to claim 9, wherein the second information includes information indicating an index for each of the one or more antennas belonging to the second antenna group.

12. The method according to claim 9, wherein the first information includes information indicating a number of antennas belonging to the first antenna group and information indicating an index for each of the one or more antennas belonging to the first antenna group.

13. A user equipment receiving a signal from a base station of a certain cell, which includes a plurality of distributed antennas spaced apart from one another at least a predetermined distance, the user equipment comprising:

a receiver configured to receive the signal; and a processor configured to control the receiver to receive, from the base station, first information informing the user equipment of a first antenna group having one or more antennas used for communication with the user equipment among the plurality of distributed antennas within the certain cell and receive second information informing the user equipment of a second antenna group having one or more antennas interfering with the user equipment among a plurality of distributed antennas within a neighboring cell of the certain cell, and configured to generate channel quality information on the basis of the first information and the second information, wherein the second information includes information indicating a number of antennas belonging to the second antenna group.

14. The user equipment according to claim 13, wherein the second information includes information on a reference signal pattern of the neighboring cell, and the processor is configured to acquire a reference signal of the neighboring cell on the basis of the reference signal pattern information of the neighboring cell.

15. The user equipment according to claim 13, wherein the second information includes information indicating an index for each of the one or more antennas belonging to the second antenna group, and the processor is configured to calculate an interference signal from the second antenna group based on a reference signal of the neighboring cell and the second information.

16. The user equipment according to claim 13, wherein the first information includes information indicating a number of antennas belonging to the first antenna group and information indicating an index for each of the one or more antennas belonging to the first antenna group.

* * * * *